(12) United States Patent
Pachikov et al.

(10) Patent No.: US 9,171,132 B1
(45) Date of Patent: Oct. 27, 2015

(54) ELECTRONIC NOTE MANAGEMENT SYSTEM AND USER-INTERFACE

(75) Inventors: Stepan Pachikov, New York City, NY (US); Peter Kvitek, Moscow (RU); Michael Lunsford, San Carlos, CA (US); Edouard Talnykine, Delray Beach, FL (US)

(73) Assignee: Evernote Corporation, Redwood City, CA (US)

( * ) Notice: Subject to any disclaimer, the term of this patent is extended or adjusted under 35 U.S.C. 154(b) by 505 days.

(21) Appl. No.: 13/555,545

(22) Filed: Jul. 23, 2012

Related U.S. Application Data

(63) Continuation of application No. 10/936,193, filed on Sep. 7, 2004, now Pat. No. 8,880,597.

(51) Int. Cl.
*G06F 15/16* (2006.01)
*G06F 21/00* (2013.01)

(52) U.S. Cl.
CPC ........................ *G06F 21/00* (2013.01)

(58) Field of Classification Search
CPC ........................................... G06F 21/00
USPC ............................................. 709/205
See application file for complete search history.

(56) References Cited

U.S. PATENT DOCUMENTS

| | | | |
|---|---|---|---|
| 6,268,852 B1 * | 7/2001 | Lindhorst et al. | 715/744 |
| 6,337,696 B1 * | 1/2002 | Lindhorst et al. | 715/763 |
| 6,879,994 B1 * | 4/2005 | Matsliach et al. | 709/204 |
| 7,263,545 B2 * | 8/2007 | Digate et al. | 709/206 |
| 7,278,092 B2 * | 10/2007 | Krzanowski | 715/205 |
| 7,321,886 B2 * | 1/2008 | Swaminathan et al. | 706/60 |
| 7,383,505 B2 | 6/2008 | Shimizu et al. | |
| 7,496,830 B2 * | 2/2009 | Rubin et al. | 715/206 |
| 7,908,401 B2 * | 3/2011 | Chang | 709/250 |
| 7,912,480 B2 | 3/2011 | Moosavi et al. | |
| 8,572,751 B2 * | 10/2013 | Boyer et al. | 726/26 |
| 2011/0145823 A1 | 6/2011 | Rowe et al. | |
| 2011/0184960 A1 | 7/2011 | Delpha et al. | |

FOREIGN PATENT DOCUMENTS

WO    WO 2010/120925 A2    10/2010

* cited by examiner

*Primary Examiner* — Gerald Smarth
(74) *Attorney, Agent, or Firm* — Muirhead and Saturnelli, LLC

(57) ABSTRACT

An electronic note management system is provides that includes a storage component, a user-interface, and one or more navigation features. The storage component maintains a plurality of records, and the user-interface component renders a plurality of electronic notes from the plurality of records. The user-interface is configured to display a given group of two or more notes in the plurality of notes as a sequenced series while the two or more notes are in a rendered state. One or more navigation features provided with the user-interface to enable a user to navigate (i) from a first note in the group to a next note in the group that is adjacent to the first note in the sequenced series (ii) while the first note and the next note are in the rendered state.

12 Claims, 17 Drawing Sheets

DIRECTORY VIEW 414 410 418

0
CATEGORIES    MARKETING
CATEGORY      5
SUBCATEGORY   51, 52
DATE_CREATED  40
DATE_MODIFIED 2004/ 01/ 27 19:29:38
              2004/ 07/ 13 21:43:45

CATEGORY DATA ITEM 424  420        428

ACTIVE_NOTES  2
CONTENT       Note-taker Peter's website http://
              www.notetakepeter.com
HISTORY       524, 604
CATEGORY      41
DATE_CREATED  2004/ 01/ 27 19:29:38
DATE_MODIFIED 2004/ 07/ 13 21:43:45

NOTE DATA ITEM

ELECTRONIC NOTE MANAGEMENT SYSTEM AND USER-INTERFACE

RELATED APPLICATIONS

This application is a continuation of U.S. application Ser. No. 10/936,193 filed Sep. 7, 2004 now U.S. Pat. No. 8,880,597, which is incorporated by reference herein.

TECHNICAL FIELD

The disclosed embodiments relate generally to the field of electronic notes. In particular, the disclosed embodiments relate to a system and method for presenting electronic notes.

BACKGROUND

Electronic notes have existed for several years. The APPLE NEWTON, manufactured by APPLE INC. was one of the earlier mobile devices to run a note application. Notes were presented end to end, based on user-inputted content through a stylus. Since then, note applications have progressed into other platforms. Currently, MICROSOFT OUTLOOK offers a Note application in which users can create notes, copy content into and out of notes, and color-code the notes. The PALM OS, manufactured by PALMONE INC. offers similar functionality for handheld devices. In those devices, users may set alarms for notes, so that notes provide timed notificationfunctionality.

Note functionality has also been incorporated into other applications. Many core applications of personal information management systems carry note functionality. For example, the Contacts feature of OUTLOOK enables users to enter information about users as if the contact record were a note. The PALM OS enables users to call a note as an attachment to other records.

Electronic note programs are convenient for users to record information quickly. Many such programs do not require users to save content entered into the note, as the content is saved automatically. But most current note applications are cumbersome to use. In general, the current applications require users to open and close individual notes, and they list little information other than metadata about the note to enable the user to select a note to open. In order to locate a particular note, the user must scan through note titles, or additional metadata about the notes, and perhaps open and close several notes until they find the note sought. A search feature provided with some note applications is useful when search terms are readily known, but the search feature does not facilitate scrolling or browsing notes.

In applications such as OUTLOOK NOTES, the user can assign categories for notes. But the process of category assignment is always entirely manual, and requires right-clicking on a category, choosing the Categories command, checkmarking the category to be assigned and then clicking "OK": When notes carry very limited information (such as a single password), this process becomes very inefficient.).

DETAILED DESCRIPTION

Figure 1A:
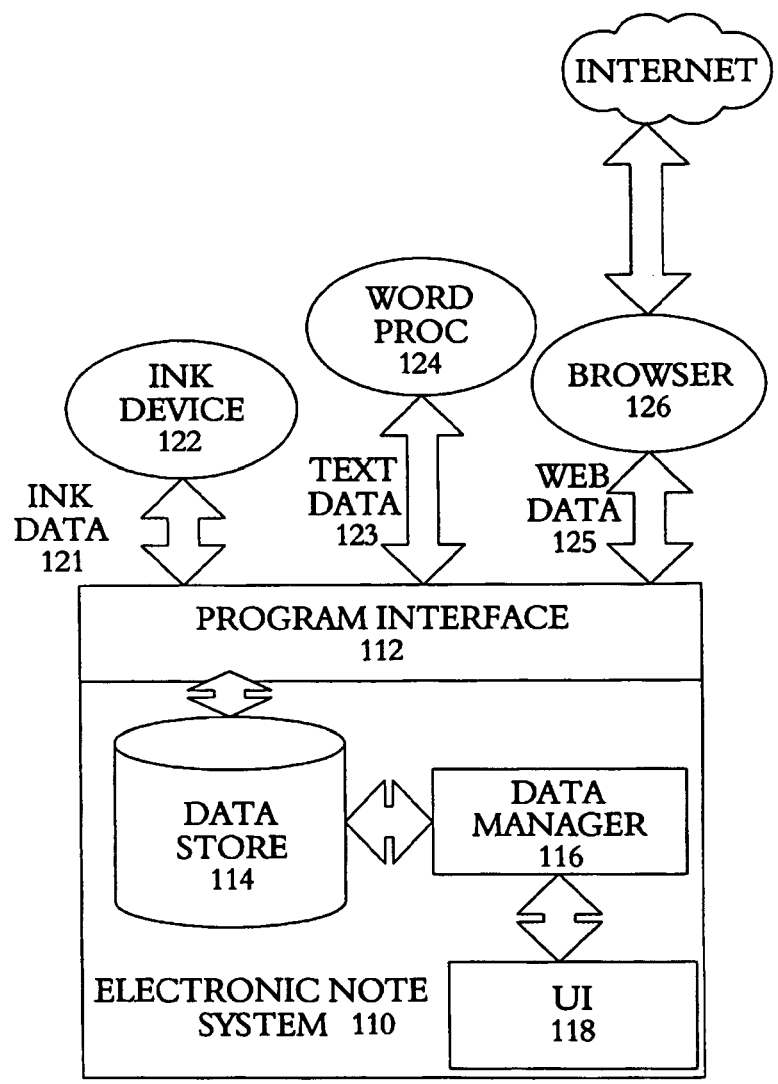
FIG. 1A illustrate an electronic note system, under an embodiment of the invention.

An electronic note system is provided that enables users to readily view, organize and locate electronic notes. More specifically, embodiments of the invention provide numerous functions and interfaces in which users may categorize, filter, search and navigate electronic notes.

Overview

Embodiments of the invention include an electronic note management system comprising a storage component, a data manager and a user-interface component. The storage component maintains a plurality of records. The data manager and the user-interface component combine to render a plurality of electronic notes from the plurality of records. The data manager and the user-interface component combine to arrange a given group of two or more notes in the plurality of notes as a sequenced series while the two or more notes are in a rendered state. One or more navigation features may be provided with the user interface to enable a user to navigate (i) from a first note in the group to a next note in the group that is adjacent to the first note in the sequenced series (ii) while the first note and the next note are in the rendered state. Additionally, each of the plurality of records includes data for rendering a content body on one or more notes that are rendered from that record. The data for rendering the content body for each of the plurality of notes may be of one or more data types.

In one embodiment, the data for rendering the content body for each of the plurality of notes may be of a type for rendering an image, a text output (including a rich text output), a markup language content, electronic ink output, or even an audio output.

An output of an embodiment such as described may correspond to a presentation where multiple notes are sequenced on one panel or display area. A navigation feature enables a user to scroll from one note to another note in a seamless manner. It is also possible for the scrolling to enable one note to be more prominently displayed than another note, while both notes are concurrently displayed in the same panel or display area. Additionally, notes displayed in the panel or display area may include content of different types. For example, a user may scroll from one note in a sequence that displays an image to another note in the sequence that displays text, or a combination of text and image. The electronic note system then enables the presentation of notes to be a hub where user-selected content can be stored and retrieved for quick access. The ability of the user to seamlessly navigate from one note to another note on the same presentation further enhanced the user's ability to view the content and quickly retrieve selected content when desired.

Embodiments of the invention include features to enable users to organize and rapidly locate specific notes. Specifically, the user can organize and locate specific notes without knowing exactly where an individual note is provided in the presentation, or even what is contained in the note. Organization features include the ability to automatically categorize notes, or for users to manually categorize notes, and to render notes using category filters. The category filters may be simple or more complex. For example, the user may filter notes based on a single category or based on two categories. In the latter case, the filter may produce notes that are in both categories. Alternatively, based on user-preference or selection, the two category filter may yield all notes that are in one or both categories.

Furthermore, the ability to locate notes may be enhanced by a search feature. In one embodiment, the search feature compares a search criterion with the content bodies of notes to identify notes that match the criterion. Other examples of features that facilitate the location of notes includes a time band (e.g. a calendar based time band) and a histogram that reflects how many notes were created and/or modified on a given date.

A note is an item having content that is rendered by an application. A note may be rendered from a record. When rendered, a note may automatically save any change (including creation, modification or deletion) to the note's content in response to any input event that causes such content changes to occur. Examples of input events include alphanumeric entry from a keyboard; a gesture made through use of a gesture input device (digital pen, stylus, WRITE ANYWHERE (manufactured by the MICROSOFT CORPORATION) pointer); electronic text and document selection, copying and pasting; a click and drag of a displayed object through an on-screen pointer; or automatic import of digital camera and camera phone snapshots. Other attributes or characteristics of a note may include (i) a limit as to its size, (ii) a medium to provide access or view of other content while maintaining a size that is small relative to those other sources of content.

The act of scrolling means that one or more given content items progressively move from one location to another location on a display area.

Ink data refers to image data that replicates a user's gesture or stroke, as made through a user-controlled object, such as a finger, stylus, electronic pen, and mouse/pointer continuous movement. For example, the finger or stylus may be moved over a detection pad, or a touch-sensitive display. As another example, a pointer can be moved to replicate a cursive handwriting stroke (e.g. as provided in the WRITE ANYWHERE application).

Embodiments described herein are not platform or device specific, and may be implemented through the use of executable instructions that can be stored and/or used in any computer-readable medium. One or more embodiments described herein may be implemented through the use of instructions that are executable by one or more processors. Methodologies, systems, and components described in this application provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and PDAs), and magnetic memory. A computer-readable medium as used herein may extend across multiple machines. For example, the medium may be distributed between client and server in order to perform a stated task or operation.

Electronic Note System

FIG. 1A illustrates an electronic note system, according to an embodiment of the invention. Elements of an electronic note system 110 include an application program interface (API) 112, a data store 114, a data manager 116, and a user-interface (UI) 118. Each component described in FIG. 1 may be provided as a module. In one embodiment, the electronic note system 110 may exist in the form of a client side application. For example, the electronic note system 110 may reside on a desktop computer of the user. In another embodiment, the electronic note system 110 may include a network side service. For example, the electronic note system 110 may be accessible to the user, along with numerous others, over the Internet. Still further, the electronic note system 110 may exist as a service having components/modules that reside on both the client and the server. For example, UI 118 may exist on a client terminal (or shared between client and server), while the data manager 116 and data store 114 reside on a server. Alternatively, a portion of the data server 114 (such as the archive copy) may exist on the server. Numerous other variations are possible as well. As will be described, the electronic note system 110 may be used to produce a presentation of electronic notes, organized by date, subject, category or other criteria. Each note may be based on individual records maintained in the data store 114.

In one embodiment, the data store 114 is a relational data structure, such as a database in which one or more tables are maintained. In another embodiment, the data store 114 stores data items that emulate relational data structures. Additional description of such an embodiment is provided below. The data manager 116 may access records from the data store 114 and present the records through UI 118. Numerous actions, operations and uses for notes may be performed or implemented through the use of the data store 114 combined with the data manager 116. In addition, the UI 118 provides a mechanism by which a user may enter input and otherwise interface with the electronic note system 110. The UI 118 may include one or more skins to facilitate the graphic display of the presentation of notes.

In one embodiment, the API 112 includes one or more applications that are capable of interfacing with multiple types of applications and/or devices so that individual notes can include content of different types. In one embodiment, the API 112 includes a routine or program for every application or device that interfaces with the electronic note system 110. For example, one presentation of electronic notes may include individual notes that have the following content: image (e.g. JPEG, GIF or PDF), text, ink, web-based (e.g. HTML), audio and video. In an example provided by FIG. 1A, the electronic note system 110 may be capable of interfacing with an ink device 122 in order to receive and carry "ink data" 121. Ink data 121 may correspond to gestures, strokes, stylus/pen movements, and/or pointer movements from handwriting devices and/or pointers (including software based pointers). The ink data 121 may be rendered to present gestures or handwritten notes in a content body of a note. The electronic note system 110 may also be capable of interfacing with a word processing application 124 to receive and carry text data 123 in its content. The browser 126 may interface with electronic note system 110 to provide markup language data 125 from sites on the Internet or other network. The browser 126 may also provide other forms of data, including image data (e.g. JPEG or GIF format, or PDF data produced by ACROBAT (manufactured by ADOBE, SYSTEMS, INC)) and text data. Thus, the content body of each note provided by the electronic note system 110 may carry and render data corresponding to ink data, text data, image data, web-based data. The content body of each note may also carry video and/or audio data.

In addition, the API 112 may be configured to import data from (or export data to) to other organization applications, including for example, MICROSOFT OUTLOOK (manufactured by the MICROSOFT CORPORATION) and PALM DESKTOP (manufactured by PALMONE INC.). In addition, the electronic note system 110 may interface with numerous other types of devices and applications in order to provide or access different kinds of data. As an example, an interface may be provided to an audio input device, such as a microphone, so that a note can be used to access recorded audio information. The interfaces may allow notes to be imported and exported amongst different machines and devices, including amongst devices having different operating systems and/or platforms (e.g. between desktop computer and smart phone).

Notes provided by the electronic note system 110 may display or otherwise render content of different data types from numerous different sources. However, embodiments of the invention also allow notes to carry locator links to content. For content such as image data, notes may carry thumbnail views of images. In either case, the locator links and thumbnails are selectable to access a specific document or file.

As will be described, the data manager 116 and UI 118 may combine to provide notes in a categorized manner, Multiple notes may be provided at one time. Furthermore, in an embodiment, notes are sequenced, and multiple notes may be rendered at once based on category and sequence. Each note may carry content of a particular type (e.g. image, text, web-based), regardless of what other adjacent and rendered notes are displaying in the presentation provided by the electronic note system 110. Each note may also carry a combination of data types, such as for example, a combination of text and image, ink and text, or audio and text.

An embodiment provides that an electronic note system 110 such as described may be extended to multiple devices, machines and resources of the user. For example, the user may share the electronic note system between one or more of the following: (i) desktop computer for work, (ii) desktop computer for home, (iii) smart phone (e.g. a cell phone with organizational applications and email capabilities), (iv) personal digital assistant (PDA), and (v) an Internet account. The Internet account may require the user to enter a user log in and password in order to view that user's collection of electronic notes, similar to many Internet email applications. In fact, the electronic note system 110 may be integrated with an Internet email account, as well as with a local email application on a desktop or other device. If more than one device or resource is used to carry records from the electronic note system 110, a synchronization feature may be provided using one of the many synchronization protocols available. For example, one embodiment may compare individual notes that correspond to one another in order to see which note was most recently updated, then overwrite the note that was older. Alternatively, notes from one system may overwrite all other notes on another system (e.g. desktop device overwrites cell phone records) with each synchronization. A synchronization operation may be performed over numerous connection mediums, including serial port or local connections, network connections, and wireless (e.g. BlueTooth and WIFI) connections.

Features and Functionality of Electronic Note System

Figure 1B:
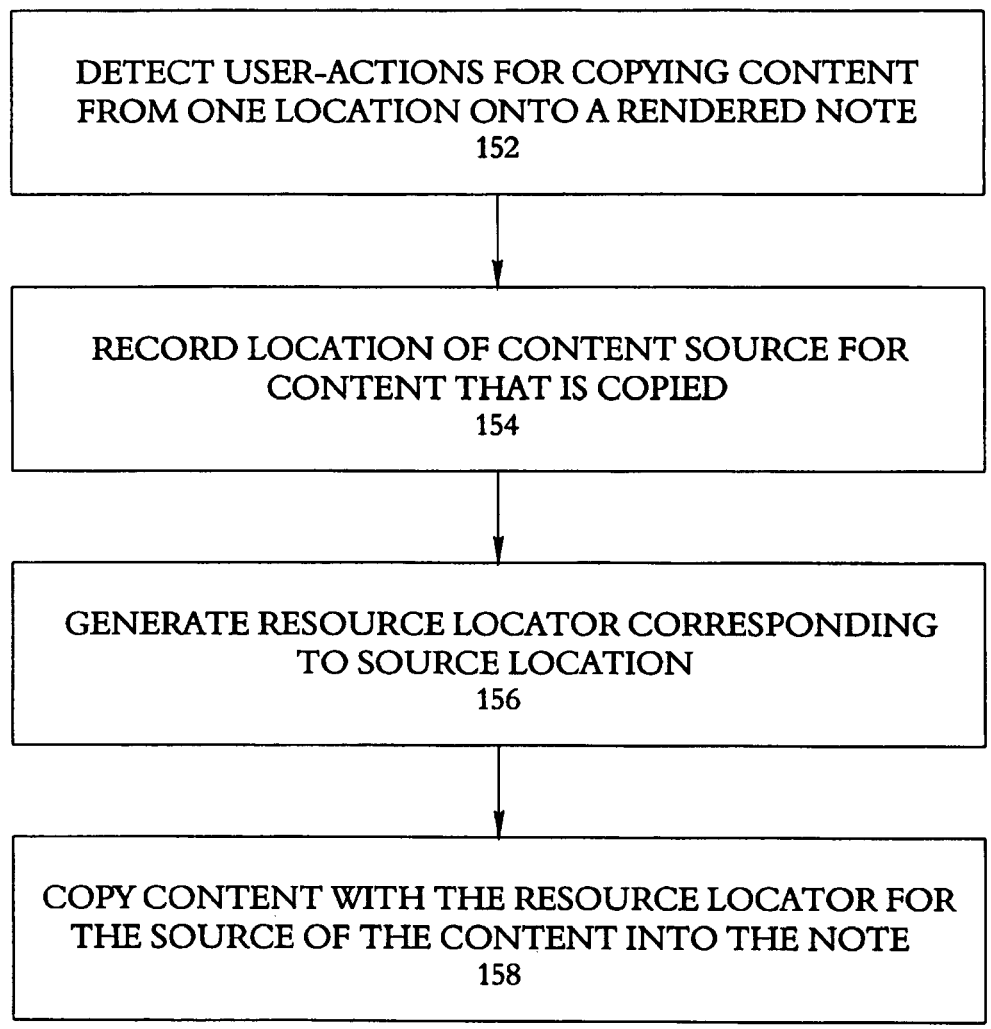
FIG. 1B illustrates a method for recording the source of content that is copied into an electronic note, under an embodiment of the invention.

FIG. 1B illustrates a method in which the source of content carried by a note may be recorded on the note itself. For example, a note may carry a portion, summary or thumbnail of a desired content in its content body. An embodiment such as described in FIG. 1B enables the same note to carry or embed a data element that is selectable to locate the source of the content in the body of the note, regardless of whether the source of the content is local, on a closed network, and/or available over a public network such as the Internet, so that all of the original content from which the content of the note was captured is rendered or made available to the user. Reference is made to elements of FIG. 1A, for purpose of providing suitable components that can perform one or more steps described.

Step 152, electronic note system 110 detects one or more designated actions that the user performs in order to initiate/cause content to be copied and/or moved from a source to a note. The source may include a document, such as a text document (e.g. WORD file), an image file, or HTML page. The source may be located locally, on a connected computer (such as through a direct connection, a local area network or other network connection) or on a website. The one or more actions may be designated actions that trigger the electronic note system 110 into performing a method of FIG. 1B. In one embodiment, an item corresponding to a file, document, or selected portion thereof are copied onto the clipboard of the operating system on which the electronic note system 110 operates. As an additional or alternative embodiment, the action(s) that trigger the electronic note system include detecting that content is being "dragged" or otherwise actively moved from one location to a rendered note. A dragging operation may be performed through the operation of a pointer mechanism, such as a mouse. As an example, the triggering events may include the opening of a software window where the content source is rendered, the copying of content in that window, and the pasting of the content onto a rendered electronic note.

Alternatively, an embodiment provides that the actions of the user may be performed with or through the UI 118. For example, UI 118 may include a feature that can be actuated in order to initiate performance of a method such as described in FIG. 1B. For example, the user may click an icon that signals the data manager 116 (or some other component) to record the source of a content that is to be copied.

In step 154, the source location of the copied content is recorded by the electronic note system. This may occur at time when the one or more actions are first initiated. In one embodiment, the source location of the content is identified using metadata that is generated by the operating system of the terminal on which the electronic note system 110 is provided, in response to a copy content operation. For example, with MICROSOFT WINDOWS operating system, the clipboard records the metadata. The electronic note system 110 may retrieve this metadata from the clipboard in this step. In an embodiment where the user actuates a feature on the UI 118 to record the source of content, a program or script of the electronic note system 110 may be executed to record the source location of the content that is subsequently copied.

In step 156, a resource locator for locating the source of the content is generated based on recorded data corresponding to the source of the copied content. For example, a uniform resource locator (URL) or similar form of link may be generated by data manager 116 to correspond to the location of the source content recorded in step 154. In one embodiment, the data corresponding to the source of the copied content is metadata provided on the clipboard of the operating system. Thus, a URL or other locator to the source of the content may be generated from metadata carried in the clipboard.

Step 158 provides that the URL or resource locator along with the copied content are copied into a content body of an electronic note. In one application, the URL or resource locator may be embedded in a designated portion of the note. Subsequently, the user may select the locator in order to access the document. For example, if the locator is for a WORD file stored locally, the WORD application and file may be opened. If the locator is for a content on a website, the browser may be launched with selection of the locator. The locator may then be signaled to the browser so that the browser can access and load a web page corresponding to the source of the content item. For example, the note can be displayed through UI 118, with a selectable URL to the source of the content.

In an embodiment, one or more steps recited in a method such as described in FIG. 1B may be performed automatically by components of the electronic note system 110. For example, once the source of content that is to be copied is identified in step 152, the step of identifying the location of the source (step 154) and the step of generating the resource locator (156) may be performed automatically. While the step of copying the content into the note may be performed with some manual action by the user, the portion of the step corresponding to copying the resource locator of the source content may also be performed automatically.

Alternatively, an embodiment provides that features from UI 118 are made persistent or otherwise extended to other embodiments for purpose of invoking functionality and operations from the electronic note system 110. In one embodiment, an icon may be provided on a toolbar or other region of an open application, in combination with an open document or item. Selection of the icon by the user may trigger the electronic note system 110 to copy content from the open application document to a new note. In addition to importing data from the application into a new note (or alternatively causing the other application to export data into the new note), actuation of the icon may cause the electronic note system to record and/or generate a resource locator of that document in the same note.

Action Notes

According to an embodiment, the electronic note system 110 may schedule, manage and perform one or more actions automatically with individually designated notes or sets of notes. In one embodiment, individual actions are associated with select notes, and the actions are performed automatically.

Step 170 provides that a desired action is defined and/or selected. One example of a desired action includes a message action, where a note is sent as an attachment of an email, or a note's content body used to generate a message body. A message action may also be extended to other forms of messaging including instant-messaging. Other examples of desired actions include an action to delete a specific note. For example, a user may wish to avoid note clutter by setting certain notes to delete after 24 hours. Other exemplary actions include using a note as an alarm, and launching another application for use with a specific note.

Step 172 provides that the desired action is associated with a specific note. For example, the user may select the action (email a note as an attachment) and then select a note. One embodiment provides that the selections for performing this step are performed by the user through the use of UI 118. For example, UI 118 may include features corresponding to pre-programmed scripts that can be executed on selected notes. Alternatively, an interface may be provided for the user to create his own script for performing a defined action. Still further, a wizard or programmatic assistant may be provided to facilitate the user in creating and defining scripts for performing automated actions using specified notes.

Step 174 provides that timing information is received for when the desired action is to be performed using the specified time. The user may specify or indicate a time in which the desired action is to be performed on the specific note. For example, a calendar or other timing mechanism may be provided to the user through the UI 118 to enable the user to select one or more times for the action to occur. The calendar may be provided as part of a wizard or prompt when the user defines the desired action. To provide a specific example, the user may select that a note, or its content body, or even a link to the source of the content for the body, to be sent via email to a designated user at 8:00 AM of a particular business day.

In step 176, a time corresponding to the timing information is detected by the electronic note system. At that time, the action is triggered and the desired action is carried out using the specified note.

Specific desired actions contemplated under embodiments of the invention include the following: sending emails based on information in note items; deleting notes at specified times, retrieving content from a desired network site at a desired time and then copying that content onto a note; password-protecting a note after a certain period of time has elapsed; and retrieving emails and copying the contents of the emails into selected notes. Once the user specifies the desired action, the timing information and the specified note, the subsequent action may be performed automatically. It is also possible to have the actions performed automatically through one of the interfaces, without applying a note. For example, in one embodiment, a user may configure the electronic note system 110 to interface with and send an electronic message through an email application.

Note Presentation

Figure 1C:
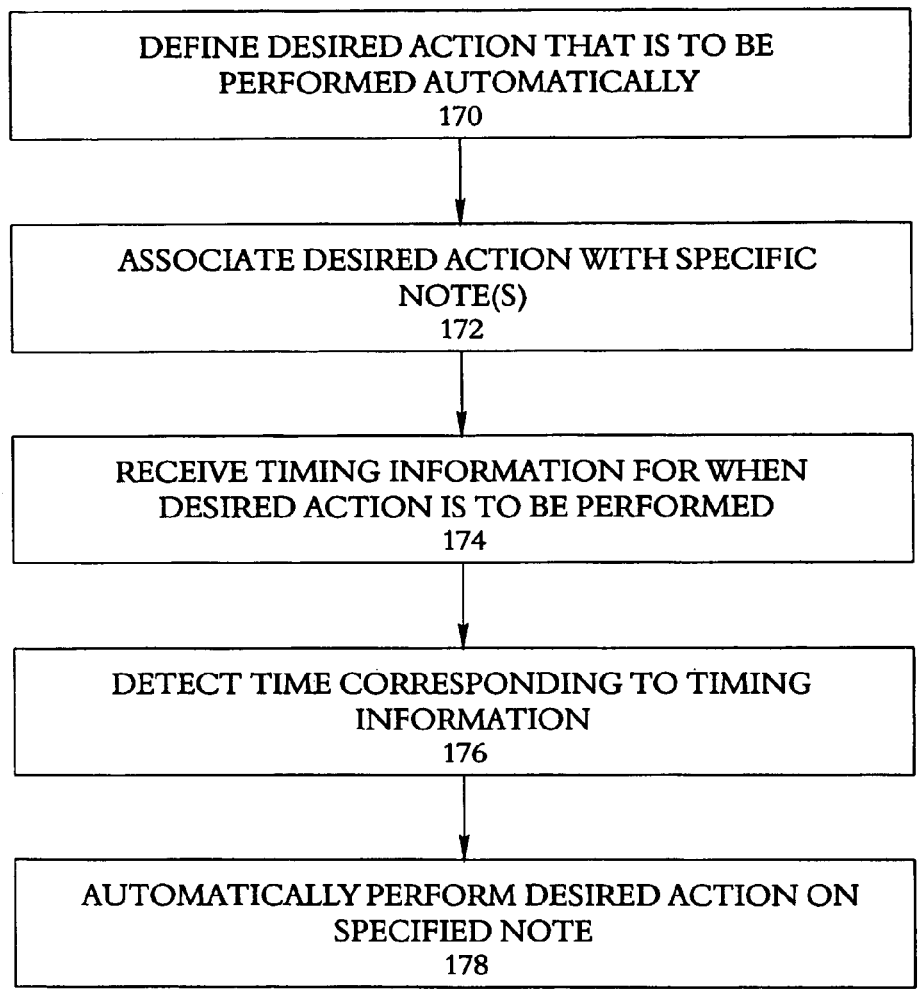
FIG. 1C illustrates a method for assigning automated tasks to be performed with specific electronic notes, under an embodiment of the invention.
Figure 1D:
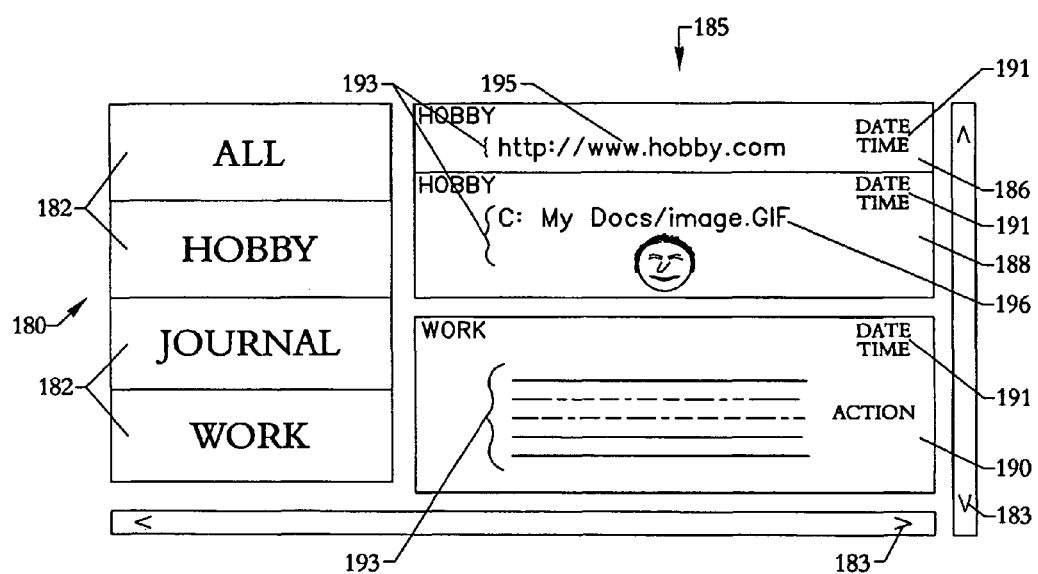
FIG. 1D is a simplified illustration of a presentation that can be created using an electronic note system such as described in FIG. 1.

FIG. 1D illustrates a simplified note presentation, according to an embodiment of the invention. A presentation 180 shown in FIG. 1D is an interface having functionality described in embodiments of FIGS. 1A-1C. In one embodiment, the presentation 180 may be provided through the UI 118. The presentation 180 includes a plurality of categories features 182. In the example provided, the category features are provided the following names: ALL, HOBBY, JOURNAL and WORK. A plurality of notes 186, 188, 190 are displayed concurrently, in a panel 185 that is adjacent to the category features 182. Each category feature 182 corresponds to a category for the notes. Each note 186, 188, 190 may belong to one or more corresponding categories, so that selection of a particular category feature 182 causes at least some (if any) notes associated with that category to be displayed in the panel 185. In the example provided, notes 186, 188 from a hobby category are displayed, and note 190 for a work category are displayed.

The notes that appear in the panel 185 may be at least partially sequenced. For example, multiple notes in one category may be sequenced to appear in a particular order when that category is selected. In the example shown, the notes are sequenced in a top-down orientation to simulate an endless tape presentation, as described in later embodiments. Furthermore, if there is space on panel 185, notes from different categories may be displayed at the same time on the panel 185. One or more navigation features 183 may be provided with the presentation 180 in order to enable the user to scroll or otherwise navigate displayed notes 186, 188, 190 and/or category features 182.

In an embodiment, the note items each include a content body where content is displayed on the respective note. In addition, each note may include one or more of the following: a category identification (e.g. "Hobby" is identified for note items 186 and 188), and a time stamp 191 indicating either one or both of when the note was created and/or modified. The panel 185 may simultaneously display notes 186, 188, and 190, each carrying content of a different data type in the content body 193. The content body 193 for note 186 is shown as a markup language data type, including a live website link 195 that when selected, triggers the web browser to retrieve a corresponding web page. The note 188 includes image content (e.g. GIF) in its content body 193. Also included in its content body is a local link 196 to a source (e.g. hard drive file) where the full image may be found. The website link 195 and the local link 196 may be recorded in the respective notes 186, 188 through a method such as described in FIG. 1B. The note 190 may include text data in its content body 193. The text data may be a summary or portion of a larger word processing application document. In the example provided, an action is identified in the note 190. This action may be a pre-programmed or an automated action, implemented through use of a method such as described in FIG. 1C.

While an embodiment shown by FIG. 1D incorporates features and functionality described in FIGS. 1A-1C, it should be noted that not all features shown in FIG. 1D need be present in the output of electronic note system 110. Different variations and combinations are contemplated. Further functional elements and details are also described below.

Data Management System

Embodiments of the invention provide for the creation and use of self-contained data items that can be independently arranged or assimilated into traditional forms of data structures. For example, self-contained and independent data items may be aggregated to emulate tables, flat files and directories. The data items are self-contained, because each data item is accessible and operable by itself, independent of other data items, data structures (e.g. tables), or rules that control access to data in such data structures. Data items may be individually aggregated and structured through implementation of links between data items. As will be described, a combination of linked data items, when considered as a whole, may define or represent a traditional data structure, such as a database. Moreover, because each data item is self-contained and independent, the same data item may form an element of another data structure, without a copy of the data item being used. Thus, it is possible for one single data item to be used for two separate representations of traditional data structures. For example, one data item may be a cell in two completely different "rows" of two different tables emulated from an aggregate of the data items.

Embodiments such as described compare favorably to the traditional database approach for numerous reasons. A traditional database employs a rigid data structure of tables having rows, and individual cells of a table cannot be accessed without reading an entire row. For example, an operation performed for one cell in a table is typically performed for an entire row of the table, and entire rows are copied to perform simple operations on data of individual cells. The result is that traditional databases require significant processing resources and memory, making such databases impractical for small computing devices, such as smart cell phones.

In contrast, embodiments described herein enable such traditional data structures to be simulated, so that the end user or application follows all the rules of the data structure in operating and using data items. At the same time, data items may be shared amongst multiple data structures without need for those data items to be copied, and the same data items may be individually accessed without need for the application or end user to access other data items (such as in the database example, where an entire row is accessed to retrieve one cell).

In an embodiment, the data items may be individually associated with each other so that the items can be queried or used in the exact same manner as a traditional database. But in fact, the items are not contained in designated rows or columns, but rather are individually associated with the equivalent of multiple rows and tables. Furthermore, the items may be used to simulate more than one type of data structure simultaneously, such as for example, multiple tables and/or directories.

According to an embodiment, a data item is defined to include the following: a global unique identification (GUID), a local unique identification (UID), and one or more attributes. Attributes correspond to named entities of one of the predefined types: link, text, integer, date and BLOB (Binary Large Object). There can be more than one attribute with the same name and type stored in a single item. Item attributes such as provided by embodiments of the application may be considered to be similar to table row fields in traditional databases; however, data items do not necessarily have the same set of attributes as have table rows The GUID of a data item identifies that item from any other data item in the universe. Thus, the GUID may be used to identify a particular item when an item is exported from one computer to another computer. In one embodiment, the GUID corresponds to a 128-bit data value that is based on a time-stamp and a device/card identifier. The GUID may be a persistent feature of any data item. The UID may identify a data item locally. In one implementation, each UID is a persistent and sequential assignment that references an individual data item to a pointer in memory where the data item is located. At a minimum, one embodiment provides that the UIDs of all data items in a particular data store are valid between an opening and closing of the database. Furthermore, the UIDs may be persistent while the application of the data store being opened and closed, so that in most cases, the UIDs can be carried over from one session to the next.

In one embodiment, the text attribute is used to store text strings. One implementation provides that text strings are stored with a data item in UTF8 format as required for international character support.

Date attributes store one or more date values. Date value may be represented as an IEEE double format, where the integer part corresponds to the number of days since January 1st 0000 (may be negative) and the fractional part corresponds to the part of a day (that is 1/24 is an hour). This allows a wide range of dates to be stored, in a simple format that is universally compatible and compact.

A BLOB attribute corresponds to an array of bytes. A BLOB attribute may not be a database interpretable attribute, but data stored as a BLOB attribute can be interpreted through an application, such as a Word file or image.

Link attributes store one or more references to other items. Link attributes have direction. That is, if item1 is linked to item2, then item2 is also linked to item1 with a backward link of the same name, thus links are always double ended. Links may also have relation types: 1:1, 1:N, M:1, M:N; when N and M>1.

Figure 2A:
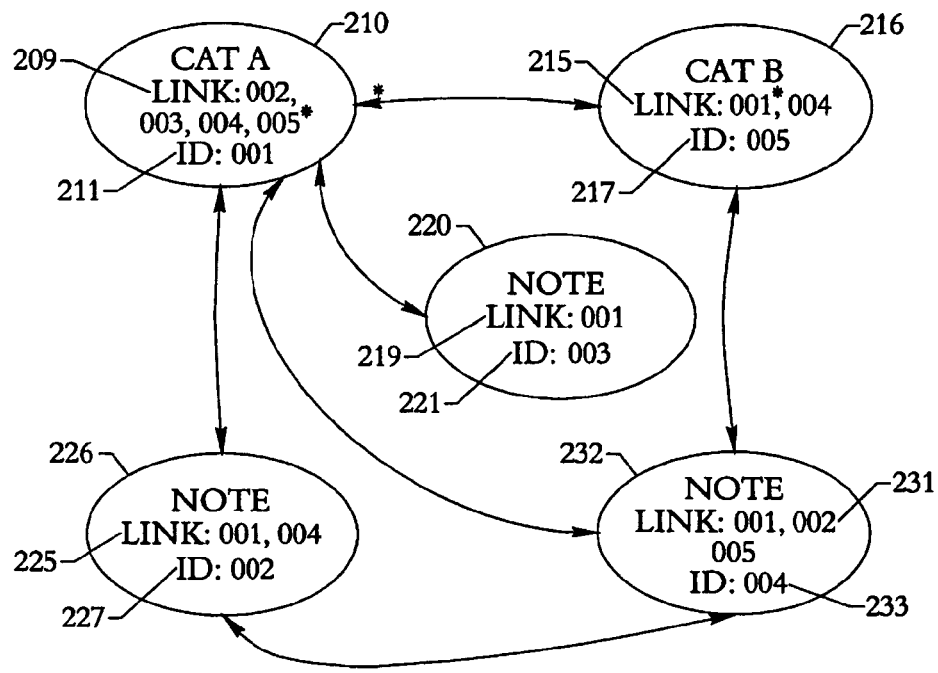
FIG. 2A illustrates a scheme for using self-contained data items to emulate a hierarchical data structure, under an embodiment.
Figure 2B:
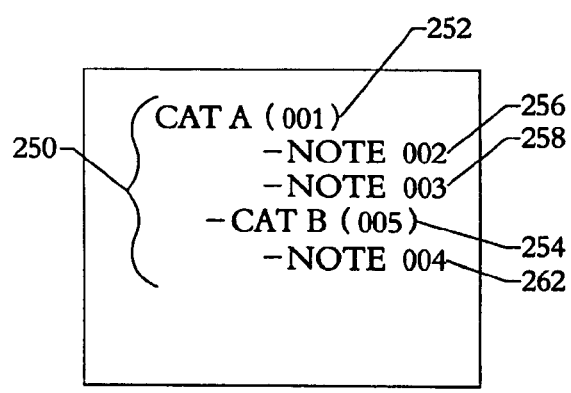
FIG. 2B illustrates an example of a hierarchical data structure that can be emulated from a relationship of data items as described in FIG. 2A.

FIG. 2A illustrates how an arrangement of data items may be implemented according to an embodiment of the invention. An arrangement illustrated in FIG. 2A may be used to emulate a hierarchical data arrangement, as shown in FIG. 2B. In the example provided, each data item is a category item or a note item. Each item includes one or more attributes and an identification. In the example shown, each item is shown to have one identification and link attributes, although as explained above, embodiments contemplate an additional GUID identification and multiple attributes of different types (text, integer, date, BLOB).

In FIG. 2A, a first category item 210 includes link attributes 209 and an identification 211 (ID:001). A second category item 216 includes link attributes 215 and an identification 217 (ID:005). A first note item 220 includes link attributes 219 and an identification 221 (ID:003), a second note item 226 includes link attributes 225 and an identification 227 (ID:002), and a third note item 232 includes link attributes 231 and an identification 233 (ID:004). In the example provided, the link attributes 209 of the first category item 210 makes reference to second category item 216, first note item 220, second note item 226, and third note item 232. Separate types of link attributes may be used when categories make reference to another category (as indicated by asterisk). The separate link attribute indicates that one category is a subcategory of the other category. The link attribute 215 of the second category item 216 makes reference to the first category item 210 and third note item 232. The link attribute 219 of the first note item 220 makes reference to the first category item 210, and the link attribute 225 of the second note item 226 makes reference to the first category item 210 and to the third note item 232.

An embodiment provides that the reference made by each link attribute is bi-directional, so that when one note is referenced by the link attribute of another note, the other note makes reference back with its own link attribute. Thus, for example, the link attribute 219 of the first note item 220 makes reference to the first category item 210. Likewise, second category item 216 makes reference back to the first category item 210, and the type of link attribute 215 indicates that the second category item is to be a subcategory of the first category.

An embodiment shown in FIG. 2A illustrates that note items may make reference to one another as well as to category nodes. Specifically, second note item 226 is shown to make reference to third note item 232. This reference may also be bi-directional, so that the third note item 232 also makes reference to the second note item 226. The reference between note items may be common in a data store that includes numerous data items. The second note item 226 may be rendered, for example, to show a reference to the third note item 232, based on a designation of the user. Alternatively, the second note item 226 may be both a category and note item. As mentioned, each data item may be an element of multiple data structures. Likewise, the association between items may be numerous. The manner in which the individual data items may be viewed and used may depend on another layer of the application.

FIG. 2B illustrates a hierarchical structure 250 that can be derived from an arrangement such as shown in FIG. 2A. The hierarchical, structure 250 may, for example, correspond to a directory. A top node 252 of the hierarchical structure 250 may correspond to first category item 210, which is linked to all other data items. A category node 254 corresponding to the second category item 216 is included in the top node 252. Nodes in the top node 252, but not in the category node 254 include nodes 256, 258 that correspond to first note item 220 and second note item 226 respectively. A node 262 in the category node 254 corresponds to third note item 232. The link attribute 209 of first category node 210 and third note item 232 may include an additional level of detail that indicates that third note item 232 is an element of a subcategory of the top node 252. For example, for link attributes between categories, there may be a separate kind of link attribute that indicates the arrangement and nature of a subcategory/category relationship between the two data items. It is also possible for the third note item 232 to be an element of both top node 252 and the category node 254 based on the link attributes illustrated by FIG. 2A.

The formation of hierarchical structure 250 from data items shown in FIG. 2A may be transparent to the user. Thus, an embodiment provides that the user may move nodes in the category to establish new hierarchical relationships, including copying and moving data items, without viewing or having to bother with the link attributes of the individual data items. A move of one node from one location to another may cause one item to alter or add to its link attribute automatically, so that the self-contained data items shown in FIG. 2A include link attributes that reflect the modified hierarchical relationship.

Figures 3A, 3B, 3C:
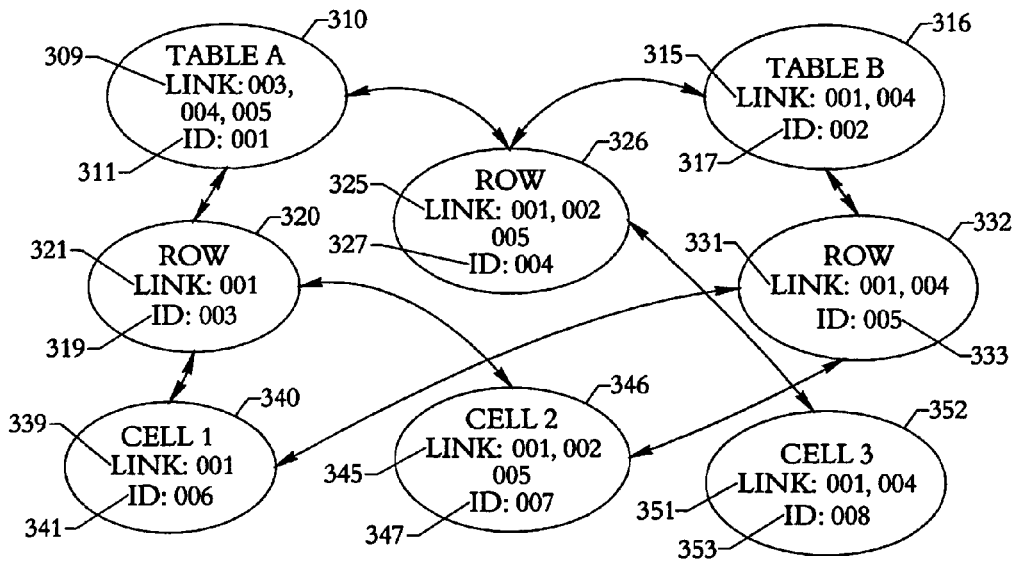
FIG. 3A illustrates a scheme for using self-contained data items to emulate one or more relational data structures, under an embodiment of the invention.
FIGS. 3B and 3C illustrate tables that can be emulated using a relationship of data items from FIG. 3A.

FIG. 3A illustrates how another arrangement of data items for purpose of emulating a database or other relational data structure. In the example provided, each data item is either a table item, a row item, or a cell item. Each item includes one or more attributes and an identification. In the example shown, a first table item 310 includes a link attribute 309 and an identification 311 (ID:001), and a second table item 316 includes a link attribute 315 and an identification 317 (ID:002). Three row items are illustrated: first row item 320 having link attribute 321 and identification 319 (ID:003), second row item 326 having link attribute 325 and identification 327 (ID:004), and third row item 332 having link attribute 331 and identification 333 (ID:005).

In order to emulate databases, it is possible for the row items to carry cell values as separate attributes. Databases may be emulated based on different arrangements of rows that correspond to row items.

As an alternative, separate types of data items may exist for individual cells of the database. In an example provided, three cell items are shown: first cell item 340 having link attribute 339 and identification 341 (ID:006), second cell item 346 having link attribute 345 (ID:007) and identification 347 (ID:007), and third cell item 352 having link attribute 351 and identification 353 (ID:008).

The link attribute 309 of the first table item 310 makes reference to the first row item 320 and the second row item 326. The link attribute 315 of the second table item 316 makes reference to the second row item 326 and the third row item 332. The link attribute 319 of the first row item 320 makes reference to the first cell item 340 and second cell item 346. The link attribute 325 of the second row item 326 makes reference to the third cell item 352. The link attribute 331 of the third row item 332 makes reference to the second cell item 346. As mentioned above, each of the references in the link attribute may be bi-directional. Thus, for example, in the case of the link attribute of the first cell item 340, the link attribute 339 makes reference to the first row item 320 and to the third row item 332.

FIGS. 3B and 3C illustrate different relational structures that can be formulated from the same set of data items shown in FIG. 3A. In FIG. 3B, a table 360 is shown to include a first row 362 corresponding to the first row item 320, and a second row 364 corresponding to the second row item 326. The cells of each row may correspond to the cell items that each corresponding row item references in its respective link attribute. For the first row 362 of the first table 360, a first cell 361 corresponds to the first cell item 340, and a second cell 363 corresponds to the second cell item 346. For the second row 364 of the first table 360, a cell 365 corresponds to the third cell item 352.

FIG. 3C illustrates how the independent and self-contained nature of the data items in FIG. 3A enable the use of the same data item for multiple data structures. The second table 370 may be emulated from the data items of FIG. 3A at the same time that first table 360 is emulated. The second table 370 may include a first row 372 that corresponds to the second row item 326, and a third row 374 that corresponds to the third row item 332. For the first row 372 of second table 370, all the cell data items that include a reference in the link attribute to the second row item 326 form the cells. This includes cell 371, corresponding to third cell item 352. For the second row 374, the cell 373 and 375 correspond to first cell item 340 and second cell item 346 respectively.

As with an embodiment described in FIGS. 2A and 2B, manipulation of data items through a layer in which tables 360 and 370 are presented may affect the link attributed of the corresponding data items. For example, the user may execute an operation where data for a third row is to be generated in the second table 370 that corresponds to the first row item 320. The user may execute a database operation to populate a new row in the second table 370. On the data item side, the link attribute 319 of the first row item 320 is modified to reference the second table 370, and the link attribute 315 of the second table item 316 is modified to reference the first row item 320.

Figures 4A, 4B, 4C:
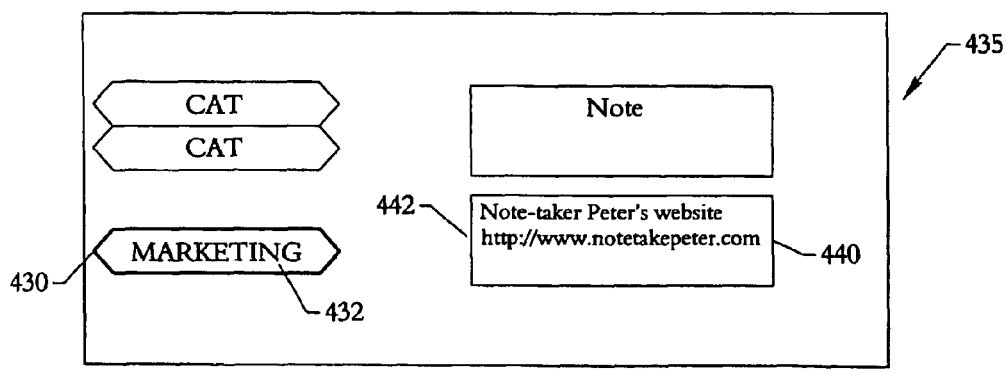
FIGS. 4A and 4B illustrate structures of data items, under an embodiment of the invention.

FIGS. 4A and 4B illustrate examples of data items for use with an electronic note management system, such as described with FIG. 1, according to an embodiment. FIG. 4A includes a category data item 410 having a set of named attributes 414 in a left column, and attribute values 418 in a right column. The attribute "0" is a display name attribute having a text string value. The value of this attribute is a display name of the data item. The attribute "CATEGORIES" may include a link value that identifies the UID of one or more other data items that are identified as a category for the data item 410 (backward link). In the example provided, the data item 410 is one item in a main or collection category. The main category may correspond to a top level node in a hierarchical architecture, in that all notes of a particular type (e.g. active notes) must belong to this category. The value of the attribute "CATEGORY" may include one or more links that identify the UID of other notes that link to the particular data item (forward link). Thus, in the example provided, the category data item 410 is a category for notes having UIDs identified in that attribute's value. The "DATE_CREATED" and "DATE_MODIFIED" attributes may be of a date data type.

Figure 6:
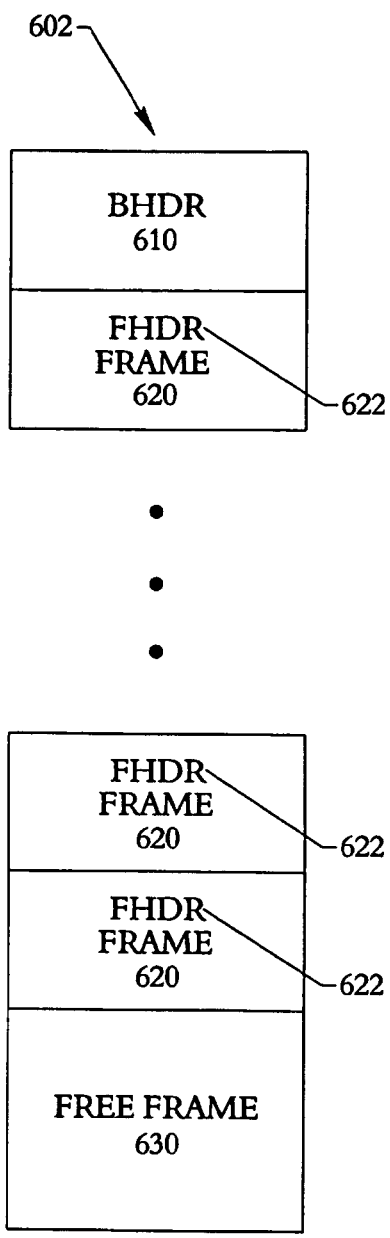
FIG. 6 illustrates a memory mapping file for a system such as described in FIG. 5.

FIG. 4B illustrates an example of a note data item 420, under an embodiment of the invention. The note data item 420 includes the following named attributes 424: "ACTIVE_NOTES", "CONTENT", "HISTORY", "CATEGORY", "DATE_CREATED" AND "DATE_MODIFIED". The "ACTIVE_NOTES" attribute may be a link that identifies the UID of a base category item. This category item may correspond to a top level node for active notes. The "CONTENT" attribute in the example provided includes a text-string value. The value of the "CONTENT" attribute corresponds to the body or content of the electronic note. As such, the "CONTENT" may alternatively be of a BLOB data type, in the case where the "CONTENT" attribute requires a large array of data. This may be the case where the note item is used to display an image, HTML content, or large amounts of text. A "HISTORY" attribute may be a link that identifies the UID of one or more note items that are archive copies of the note. FIG. 6 illustrates a technique for creating a history or archive of individual data items. The data item referenced in the "HISTORY" attribute is link to a copy of a given note that has the content of the original note captured at a given past instance. When an electronic note is manipulated, the notes referenced in the HISTORY attribute locate notes in a previous state. The "CATEGORY", "DATE_CREATED" AND "DATE_MODIFIED" may correspond to attributes described with category data item 410.

FIG. 4C illustrates the category data item 410 and the note data item 420 as rendered on a user-interface 435. The category data item 410 is rendered as a selectable category field 430 or feature (such as an icon or menu item). When the category field 430 is selected, a set of note items that are associated with that category field 430 are displayed. In the example provided, two notes are shown. The note data item 420 is shown as a displayed note 440. A content 442 of the displayed note 440 corresponds to the value of the "CONTENT" attribute in the note data item 420. Likewise, a display name 432 of the category field corresponds to the value of the "0" attribute in the category data item.

Figure 5:
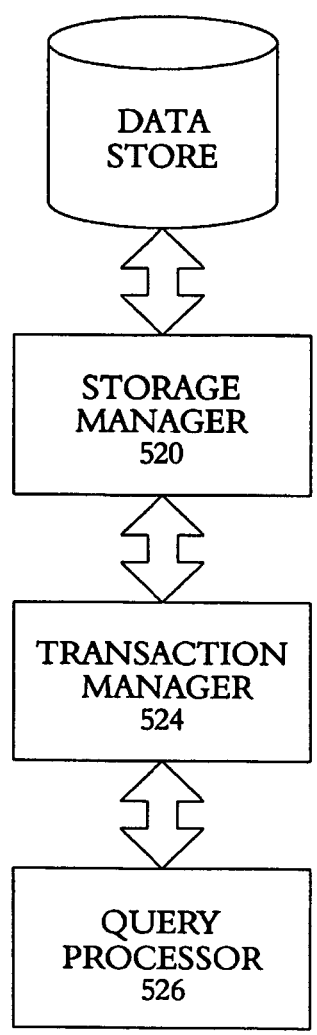
FIG. 5 illustrates a system for using data items to emulate other data structures, under an embodiment of the invention.

FIG. 5 illustrates a data management system for implementing embodiment such as described in this section. In one embodiment, a data management system 510 may include a storage manager 520, a transaction manager 524, and a query processor 526. All of these components may access data items from a data store 530. The data store 530 may correspond to local hardware where data corresponding to the data items (e.g. category data items and note data items) are stored. The storage manager 520 implements a basic storage scheme to store and retrieve items with their attributes. For efficiency, the storage manager 520 uses memory mapped files, as shown in FIG. 6. Storage manager 520 maintains item indexes that provide item name to address dereferecing in constant time and independent of the number of items in the data store.

The transaction manager 526 implements parallel transaction support for atomic database updates. As part of its operations, the transaction manager 526 may create a transaction log that records operations performed on data items in the data store 510. This transaction log may be exported to other computers for purpose of performing synchronization operations. A synchronization operation may be carried out by, for example, (i) exporting data items from the data store 510 to another device at an initial time (t=0), and (ii) exporting the transaction log at a later time (t=1) so that another transaction manager implements transactions in the transaction log that were performed on the original data store between t=0 and t=1.

The query processor 526 implements a language compiler, optimizer and evaluator. In one embodiment, the query processor 526 is Structured Query Language (SQL) based, while in another embodiment, a specialized query language may be used. In one embodiment, the specialized query language is based on the use of predicates, including mathematical and Boolean predicates, for performing comparison operations on the data items.

FIG. 6 illustrates a memory mapping file 602 for use with an embodiment of the invention. The memory mapped file storage for storing data in the data store of FIG. 5, under one embodiment of the invention. The file 602 includes a base header 610, and a series of frame 620 that each contain from headers 622. The file 602 may also contain free frames 630. The base header 610 my carry basic information about the file 602, such as the GUID for the entire data store, and the next UID available for a newly recorded note. In one embodiment, there may be one frame 620 for each note created by the electronic note system 110. Data (non-metadata) contained in each frame 620 may correspond to the content body of the corresponding note. In an embodiment, all frames 620 are linked in a doubly-linked list (previous and next). These are physical links to next and previous sequential frames. The frames 620 are used, so they contain data and have a UID that is not zero. The free frames 630, which are unused, contain no data and have UID=0. All free frames are linked to a circle doubly linked list. In one embodiment, the structure of the file 602 is similar to a Rover Based Heap implementation scheme.

Figure 7A:
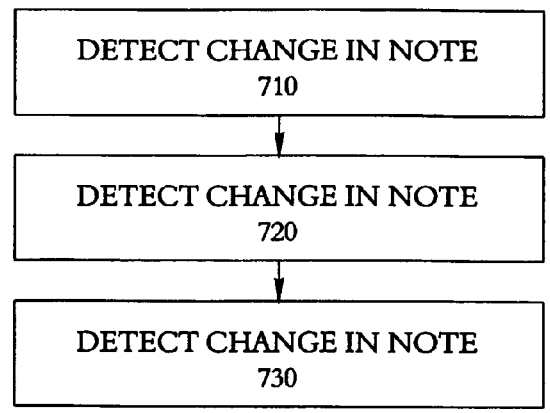
FIG. 7A illustrates a method for automatically archiving a note, under an embodiment of the invention.

FIG. 7A illustrates a method for archiving or creating a history of data items, under an embodiment of the invention. An embodiment such as shown in FIG. 7 may be used in conjunction with the use of electronic notes, as described in other embodiments of the invention.

In step 710, a data item is detected as being changed. For example, the user may edit, delete or create content from the content body of the note.

Step 720 provides that the data item is copied into a new note. This copy is a historical version of the note in use. When copied, what happens is that (i) a new note is created and assigned a UID, and (ii) the "CONTENT" attribute (see FIG. 4B) of the historical note is provided the value of the same attribute for the note in use. The note in use may be provided a link attribute to the UID of the historical note. In addition, the historical note may be assigned a category, such as "HISTORY" (see FIG. 4B). To this extent, the historical note may include link attributes that identify the category "HISTORY" and the note in use. Likewise, the note in use may include a link attribute that identifies the historical note's UID.

In step 730, changes are recorded to the note in use as they happen. According to one embodiment, the changes may alter the "CONTENT" attribute of the note in use, but the changes do not affect the historical note.

Figure 7B:
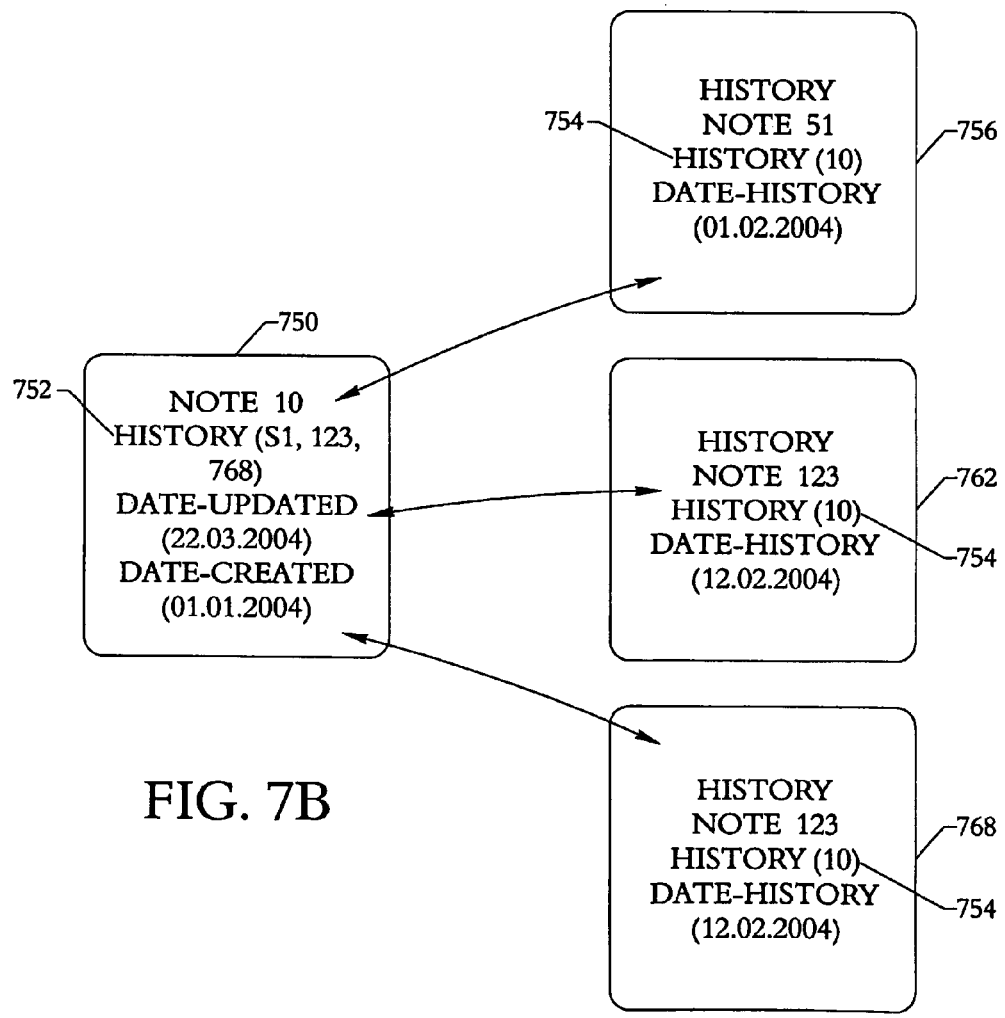
FIG. 7B is a block diagram illustrating how several history notes can be created in response to modifications or updates of a given note, under an embodiment of the invention.

FIG. 7B illustrates how historical notes may be created and referenced by notes that are current, under an embodiment. In FIG. 7B, an active note 750 (UID=10) includes a first history note 756 (UID=51), a second history note 762 (UID=123), and a third history note 768 (UID=768). In the example provided, the active note 750 was created on Feb. 1, 2004, and updated on Feb. 2, 2004. At a current date of Mar. 22, 2004, the active note 750 is modified. Each history note carries a creation date. The creation date of first history note 756 is Feb. 1, 2004, and the creation date of second history note 762 is Feb. 2, 2004. On Mar. 22, 2004, when the active note 750 is altered again, the third history note 768 is created having as its creation date Mar. 22, 2004. The electronic note system 110 may be configured to provide any number of history notes, where each history note can be retrieved by the user. For example, if a user does not like edits made to a note, the user can simply open the previous history note for the recently edited note. For this reason, each active note 750 may carry a link attribute that references all of the history notes for that active note. For example, in active note 750, a link attribute 752 includes reference to the UID of each history note 756, 762, 768. This enables the user to retrieve any of the history notes for the active note 750 when the active note is rendered or otherwise made available. Since link attributes may be bi-directional, each history note may also include a history link attribute 754 back to the active note 750.

As an example, an embodiment such as shown in FIGS. 7A and 7B may be used in the context of handwriting or speech recognition. A newly created note may carry as its content item handwriting or speech input. Before this note is converted into a text note, the item with the original handwriting/speech input may be copied as a history note. The conversion may occur for the active note, and the active note may link to the history note where the unconverted handwriting/speech input is provided.

Using data items as structured in the aforementioned embodiments for purpose of emulating different data structures and schemas provides several advantages. Among these advantages, data carried in the data store is more portable, and better suited for different platforms, because much less data is needed to perform various operations. In particular, a data store such as described in FIG. 5 may be carried and implemented onto a small device. The data store is also scalable, in that is can better carry large amounts of data. The reduction in data, and the manageability of using link attributes enables aspects of the data management system 510 to be made integral or embedded on systems with relatively limited resources, which compares favorably to the need for stand-alone servers for use with large databases. Additionally, the reduced size of the data store, and the use of link attributes enables a system to operate faster. As a result of this scalability and the efficiency provided by links between items, this system compares favorably with traditional database systems that are normally used by large e-commerce sites.

Numerous applications are possible for using a data management system such as described in the above embodiments. For example, one application includes using the data management system 510 is to provide data for loading and rendering dynamic web pages. The data items stored in the data store 510 may include items carrying content and search criteria, either in the content or through category assignments. When a web page search is performed, an initial match of an item in the data store may rapidly yield additional matches, because the identified item includes links to other items. When a match is made to a category, for example, all data items under that category are instantly identifiable because the category item includes links to all the matching items. Thus, on an e-commerce site, an author search for a novel may locate a category for that author. Then, every item under that category is instantly identifiable because of link attributes in the category item. In contrast, a traditional database approach would require the advance preparation of a huge number of indexes or the real-time scanning of tables and rows to individually locate each matching item to the search criteria.

Categorization

Embodiments of the invention provide for organizing a collection of notes in categories. Categorization provides a mechanism by which users can (i) organize or file notes and (ii) filter what notes are rendered by the UI 118 of the electronic note system 110. A mechanism by which users can readily assign categories to notes and filter notes by category becomes increasingly useful as the number of notes stored by the electronic note system 110 grows.

Figure 8A:
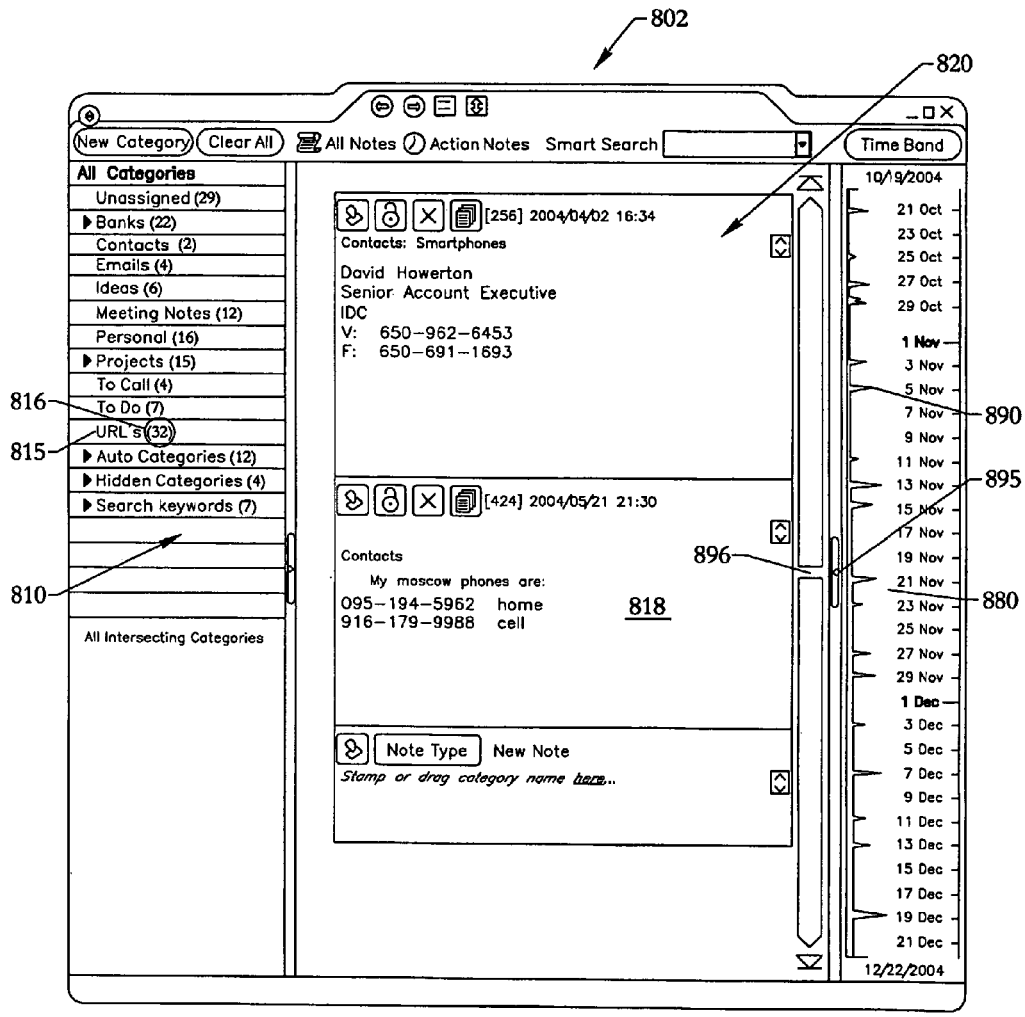
FIGS. 8A-8F illustrate different presentations and functionalities for organizing, categorizing, and locating electronic notes, according to embodiments of the invention.

FIG. 8A illustrates a presentation 802 generated under an embodiment of the invention, where multiple panels 810, 812 may be displayed at the same time. The first panel 810 may display category features 815, each of which are selectable to cause the electronic note system to display notes belonging in that particular category. The second panel 812 is where the notes 818 are displayed. Both the first panel 810 and second panel 812 may be configured by the user. For example, each panel may be selected to be hidden, made smaller or larger. A side-by-side arrangement facilitates the user in receiving visual cues that can aid the user in locating notes. In particular, the side-by-side arrangement of the panels enables the user to select one of the category features 815, and then have notes assigned to that category immediately displayed. A visual aid, in the form of a downward arrow, indicates that the particular category feature 815 has been selected, so that the user knows that at least some of the rendered notes in the second panel 812 are from the corresponding category.

Another visual aid to facilitate organizing and locating note is the note count feature 816 provided on each category feature 815. The note count feature 816 provides a value that corresponds to the number of notes that have been assigned a particular category of the corresponding feature 815. If a new note is created and assigned to a category, the note count feature will increase by 1.

Embodiments of the invention provide that multiple category assignments to be made to any one single note. For example, a password note containing passwords to financial sites of the user may be categorized under two categories: "Passwords" and "Financial".

Figure 8B:
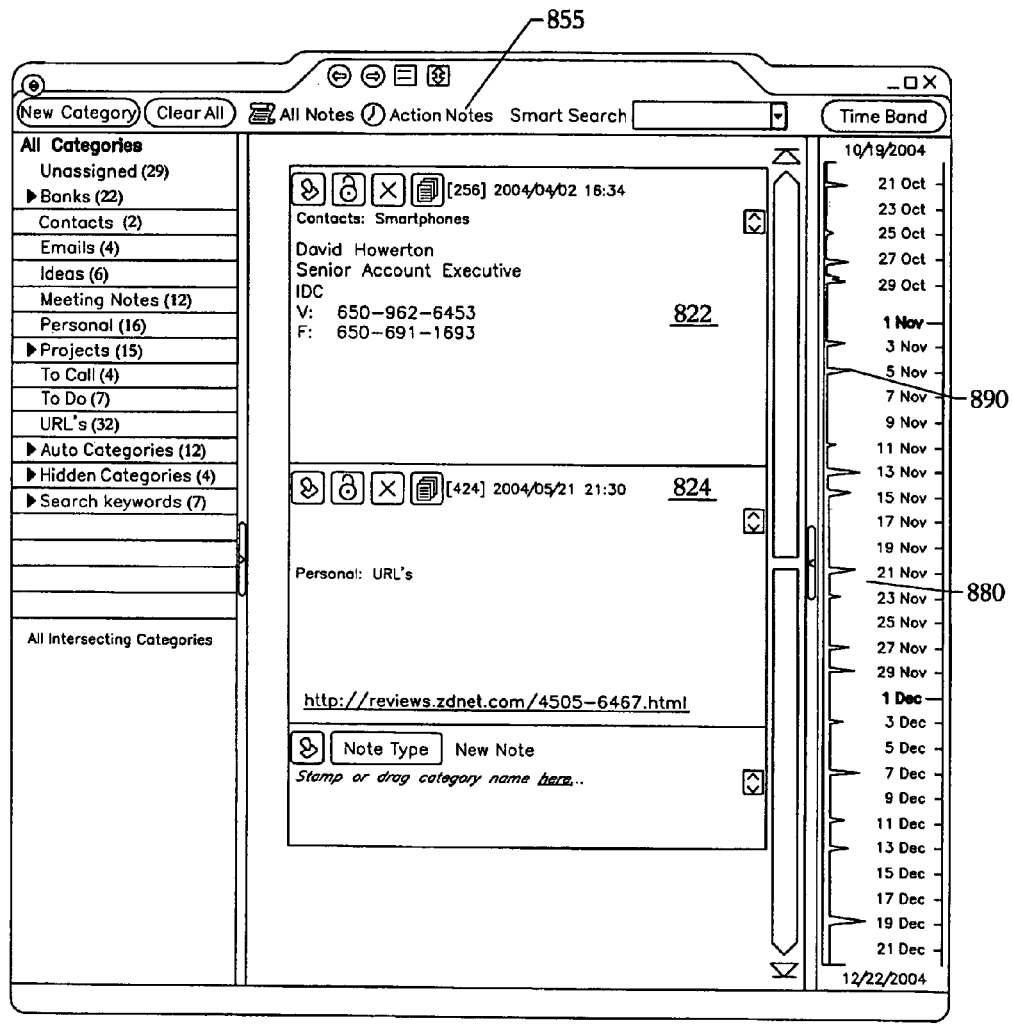

FIG. 8B illustrates an embodiment in which second panel 812 is capable of displaying notes from multiple categories. In FIG. 8B, features 815 corresponding to categories "Contacts" and "Personal" are selected. In second panel 812, select notes from each of those categories are rendered at the same time. Moreover, the select notes carry content that is of different data types. For example, contact note 822 from the "Contacts" category includes text data in its content body, while personal note 824 from the "Personal" category includes web-based data in its content body.

In an embodiment, notes may be assigned to categories in one or more of the following ways: (i) automated and by default, (ii) manually by the user and (iii) automated and by user-definition. In an embodiment, the electronic note system 110 includes numerous default categories, and each newly created note is assigned to one of the default categories automatically. In one implementation, the default categories are based on a data type of the content body of the note (e.g. types of text, image, web-based, ink). For example, notes that contain ink content are assigned to a category "Ink", while notes that contain content copied from a website are assigned to a category "Web". Furthermore, this categorization may be automatic, in response to detecting a type of the input. For example, the electronic note system 110 automatically detects "ink" input, and records the input as "ink". Furthermore, the electronic note system 110 may automatically categorize the note as an "Ink Category".

Selection of category features 815 corresponding to those categories will cause the electronic note system 110 to render all notes that were given those automatic assignments. Numerous other properties or characteristics about a note may determine an automatic default categorization of that note. For example, the type of device that created the note may cause the note to be associated with a category that is assigned to that device. To further the example, images provided by a camera device may be stored in a category "Pictures". Furthermore, the user may use templates, and the templates may cause the electronic note system to store a given note in a particular category.

Figure 8C:
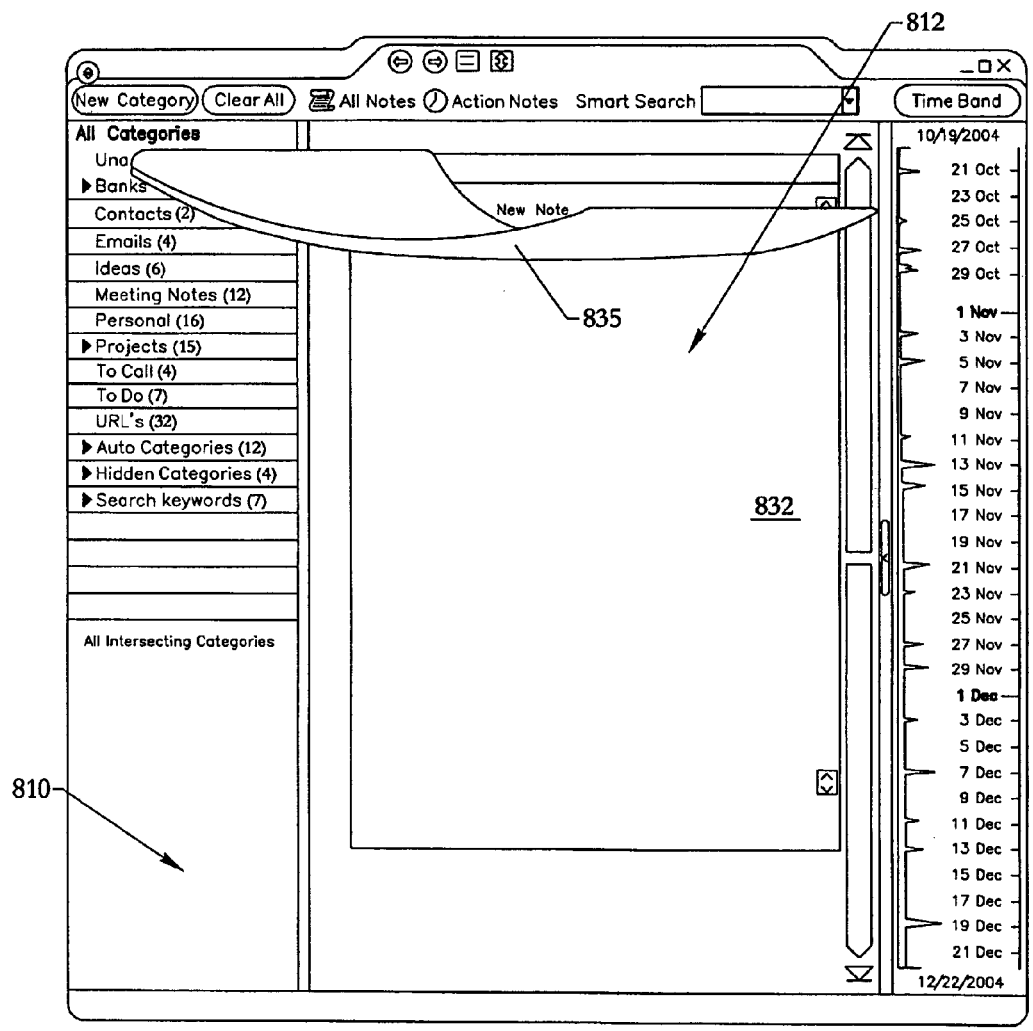
Figure 8D:
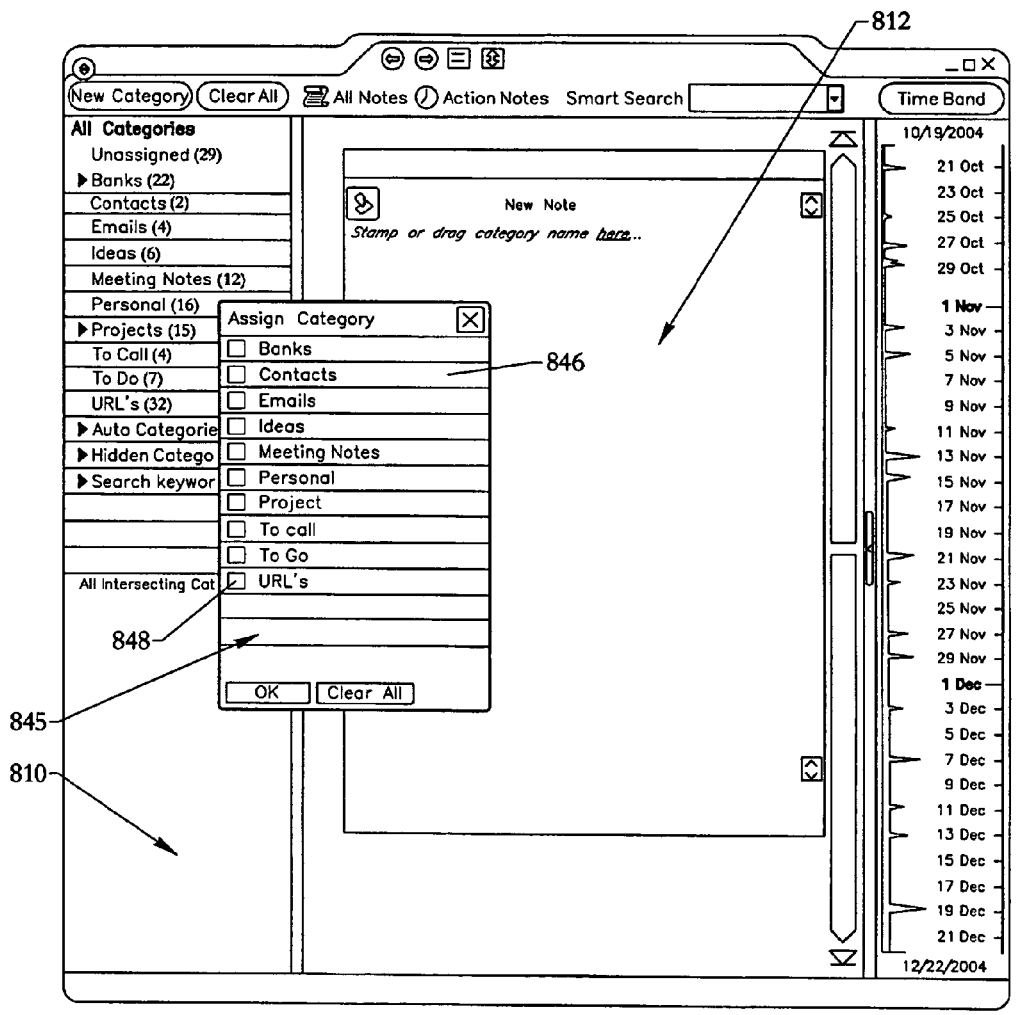

As an additional categorization tool, an embodiment permits a user to manually assign categories to rendered notes. The user may either assign an existing category to a specified note, or create a new category and then assign that note to the newly created category. The act of assigning a category to a note may be accomplished in any one of several ways. FIG. 8C illustrates a "drag and drop" mechanism in which an active note 832 is in a rendered state in the second panel 812, and a selected category feature 835 is dragged and dropped onto the active note 832. The act of dragging and dropping may be accomplished through a pointer device, such as a mouse, electronic pen, touch pad or other mechanism. FIG. 8D illustrates a selectable category menu 845 that can be called and displayed anywhere on the presentation 802. In the example provided, it is displayed over regions of both the first panel 810 and the second panel 812. The category menu 845 includes a list of category features 846, and a mechanism (such as checkbox 848) for selecting a particular category feature. When a category feature is selected, the active note 832 is assigned to that category.

Figure 8F:
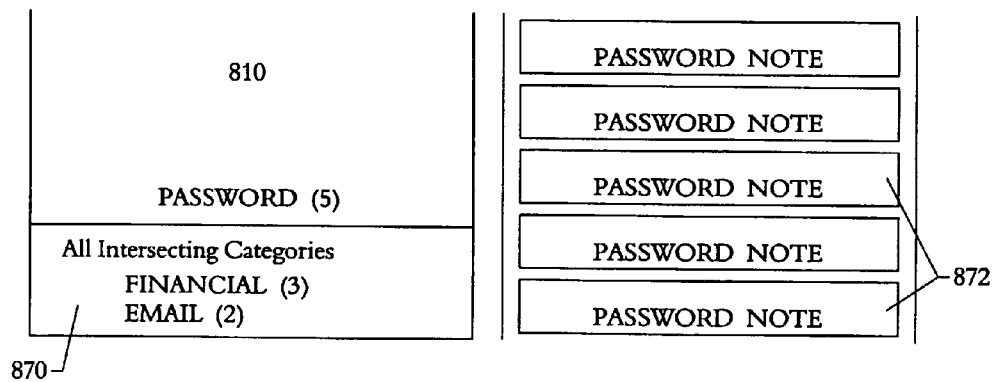
Figure 8E:
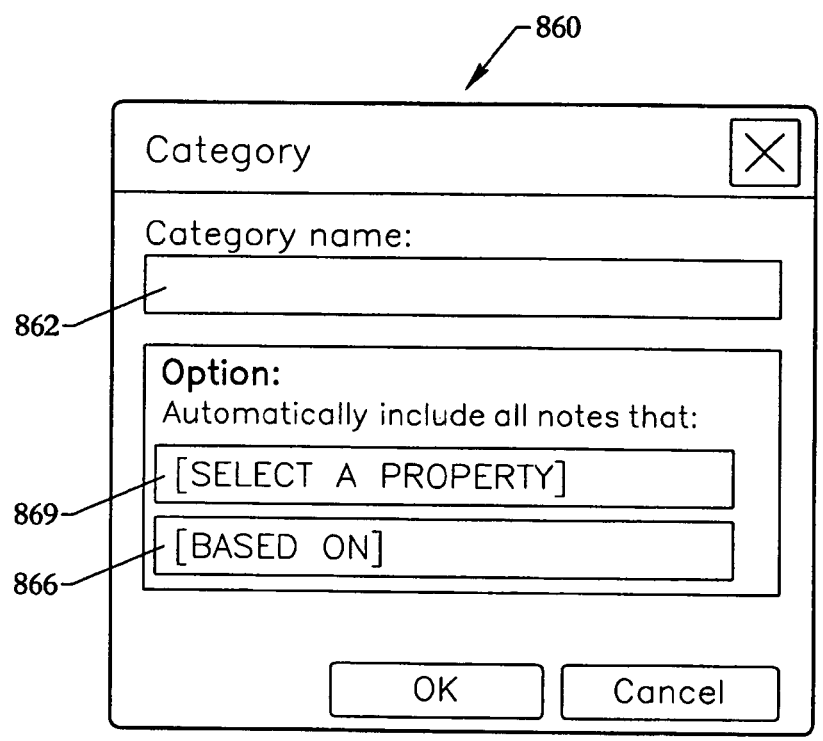

In an embodiment, the user may create one or more filtering criteria. If a note is created or modified to include the criteria, the note is automatically categorized in that category. FIG. 8E illustrates an interface 860 for enabling (i) creation of a new category based on a filtering criteria, and (ii) automatic application of the category to any note that is created or modified to include the particular filter criteria. A category field 862 enables the user to enter a name that is applied to a new category field 815. A property field 864 and an argument field 866 enable the user to define the category. Table-1 below is an example of menu items that can be included in the property field 864, and corresponding selections available in the argument field 866:

TABLE-1

| Example property | Example argument |
|---|---|
| "Are clippings from" | "Website" (or "Email", "Word", etc) |
| "Have a note type of" | "Ink" (or "HTML" or "Template") |
| "Were created by" | "Stepan Pachikov" |
| "Have keyword(s)" | "Spaghetti Italian" |
| "Are between these dates" | "8/15/03" and "6/15/04" |
| "Have history notes" | - N/A - |
| "Include hidden text" | "Portion of note is hidden" |
| "Are password protected" | "Entire note is hidden" |
| "Are locked" | - N/A - |
| "Have no categories assigned" | - N/A - |
| "Have this category" | "Contacts" |
| "Have hyperlinks (URLs, etc)" | - N/A - |
| "Have images" | - N/A - |
| "Include actions" | - N/A - |

In the example provided, the argument field may be typed in by the user and/or selected from a menu list. Once a subsequent note is created or modified to satisfy the criteria of the property field and/or argument field 866, the note is automatically assigned to the category named in field 862.

Another technique for creating user-defined categories for automatic categorization is to save search terms. The results of a saved search term may be used to define a category. A category name may also be provided that matches or corresponds to the saved search term. For example, if the user performs a note search (described below) for "Password", the search is conducted using content in the body of individual notes. The search term may be used to name the user-defined category. Subsequently, any note that is created, or modified and which satisfies the search criteria of including "password" in its content body is then automatically assigned to that category. In the example provided, a new category field 815 is created named "Password", and each note that is created/modified to contain the term "password" is automatically assigned to that category.

As described, individual categories may be used to filter a set of notes from the whole. According to one embodiment, it is also possible to filter notes from the whole using two or more categories. FIG. 8F illustrates use of an intersecting category feature 870. FIG. 8F illustrates the case where the user selects the category "Password", using one of the category features 815. The second panel 812 is used to display individual notes 872 that are in the Password category. In the example shown, the intersecting category feature 870 is provided in a region of the first panel 810. In the area of the intersecting category feature 870, additional categories of the notes 872 in the Password category displayed. In the example provided, it is assumed that the Password category contains five notes, and that three of those notes are also categorized under the category of "Financial", and two of those notes are additionally categorized under the category of "Email". Since each note may be assigned to any number of categories, in practice there may be fewer than five notes, as one note can be in both "Financial" and "Email".

What the intersecting category feature 870 allows is for the user to use filtering to quickly locate and view a small set of notes. For example, the user may need his online banking password. The user may know that the password is contained in the category Password, but it may not be readily apparent to him that the password may also be stored under the category of Financial. When the user filters all of the notes with the Password category, the user is presented with not just notes in that category, but a list of all additional categories that the notes in the Password category belong to. He sees the "Password" Category has three notes, so he can assume that there are three notes that carry passwords for financial accounts/resources. He then can make a sub-selection of the "Financial" category on the assumption that the password for his online banking account will be categorized under both "Password" and "Financial".

The use of the intersecting category feature 870 may be progressive past two selections of intersecting categories. In one embodiment, there may be a first category ("A) selection from the first panel 810, then a second category ("B") selection from the intersecting category feature 870, which yields in second panel 812 a set of notes that are in both category "A" and category "B". At this point, the intersecting category feature 870 may display additional categories, for notes that are in A, B and a third or more category. Selection of a third category from the intersecting category feature 870 may yield in the second panel 812 the set of notes that are in A,B and C. In this way, when there are many notes in a particular category, the intersecting category feature 870 enables the user to quickly locate a desired note using a progressively narrowing set of intersecting categories.

Note Search

In addition to category filtering, embodiments of the invention may provide a search tool to quickly locate a desired note that contains in its content body a specific characteristic that is specified by the search criteria. In an embodiment, the search criteria specifies a string of characters, such as a keyword, so that all notes that contain the particular keyword are returned as the search result. Other examples of a search criteria include a data type of a note's content body, and a date or date range corresponding to when a note was created or modified.

Figure 9:
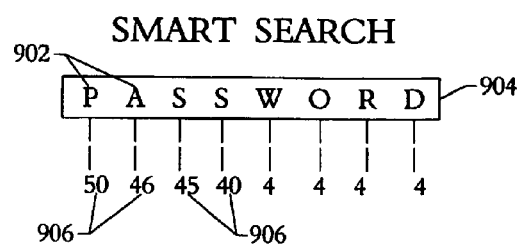
FIG. 9 illustrates a smart-search feature for use with an embodiment of the invention.

To facilitate rapid searching and identification of notes, an embodiment such as described in FIG. 9 employs a smart search feature for character string search criteria. For each character 902 that a user enters in a search field 904, a result, or an indication of a result is returned instantly. In one embodiment, what is returned is an indication of a result in the form of an integer. This is termed the return integer 906. The return integer 906 corresponds to how many notes in a set have in their content body the portion of the string entered up to that point.

In the example provided, the user's search string is PASSWORD. When the user enters P, the return integer 906 is 50. When the user enters A, the return is 46. The return integer value decreases with subsequent character entries. However, as shown by the example, a point may be reached before the user has completed the string in which no reduction in the return integer is achieved with the addition of character strings to the search term. In the example provided, the integer value's minimum is reached with PASSW. At this point, there is no additional benefit in the user completing the search string.

Endless Tape Presentation of Notes

Embodiments of the invention provide for a presentation in which notes are arranged in a rendered state to be seamless and sequential. Referring back to FIGS. 8A and 8B, notes are in an open state, so that their content bodies are viewable on the second panel 812. Moreover, when notes are open, they appear end-to-end, so that a viewer can scroll from one open note to another. As the user scrolls further, additional notes that may not have been displayed at the start are progressively presented. The feel the person is provided is that the notes are sequenced, and continuously arranged. In one embodiment, the presentation 802 is formed in which notes are presented as an endless roll of paper. Each newly created note is, as a default, tacked on to the bottom of the stack.

The endless tape presentation may be best viewable by the user when the user selects the "ALL NOTES" feature 855. This feature removes all filtering from the presentation of notes in the second panel 812. All notes are then presented in a sequence, end-to-end, in a scrollable or navigatable manner. This allows the user to scroll and read notes, and since the notes are in a rendered state, the user does not have to open and close individual notes. The sequencing of the note provides the user with a sense of order in viewing the notes, so that the user can better locate a note or determine the context of a note while scrolling Time Band Another feature that facilitates the user in locating individual notes is a time band feature 880. The time band feature 880 may display date, time and/or calendar information adjacent to the tape presentation of the notes. The time band feature 880 facilitates the user in locating a spot in the tape of notes where a particular note may be found. For example, the user may know that he created a new note to store a password in the month of March. In one embodiment, the time band feature 880 is implemented as a continuous bar from which the user may select points or regions using, for example, a pointer or mouse-click. When the region or point of the time band is selected, the presentation shifts to display notes that were either modified or created in the time range specified by the user's selection. Thus, in the example provided, the user may browse all notes created in March using the time band 880.

An embodiment provides that the time band feature 880 is calendar based, meaning it lists days, months or weeks. Furthermore, the time band feature 880 may extend lengthwise in a direction of the tape presentation. It can run alongside of the second panel 812, so that the user can view date/time information of notes that appear in the panel 812 at any given instant.

Activity Marker

In addition to time band 880, FIGS. 8A and 8B illustrates an activity marker 890 that indicates the amount of note activity at a particular point in the tape. Together, with the time band 880, the activity marker 890 indicates the amount of note activity at a particular time, date or date range. Note activity can include note creation and/or modification. In an embodiment, the note activity may also correspond to the amount of time that the user worked on a note. In one embodiment, the activity marker 890 is presented as a histogram, where a histogram value corresponds to the amount of note activity.

Activity and Time Band Configurations

Figure 10A:
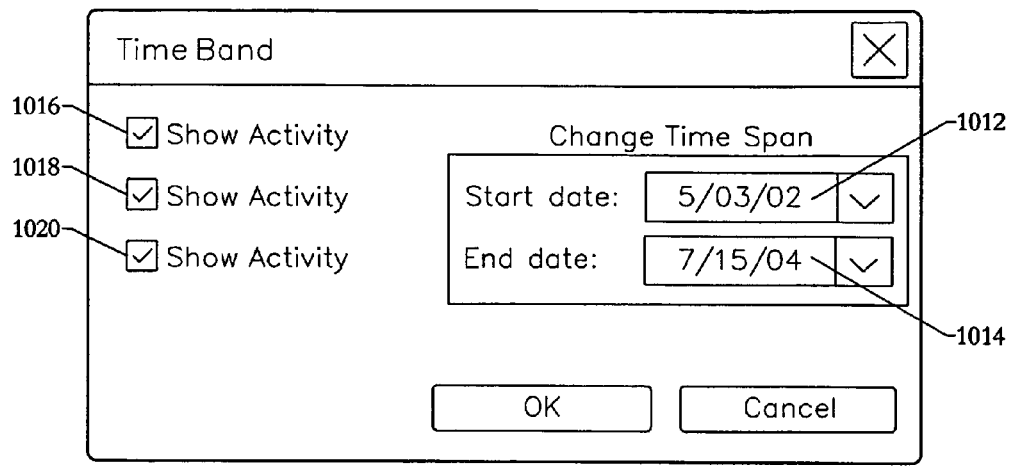
FIGS. 10A and 10B illustrate an interface for setting a time band and an activity marker for use with a user-interface as described.
Figure 10B:
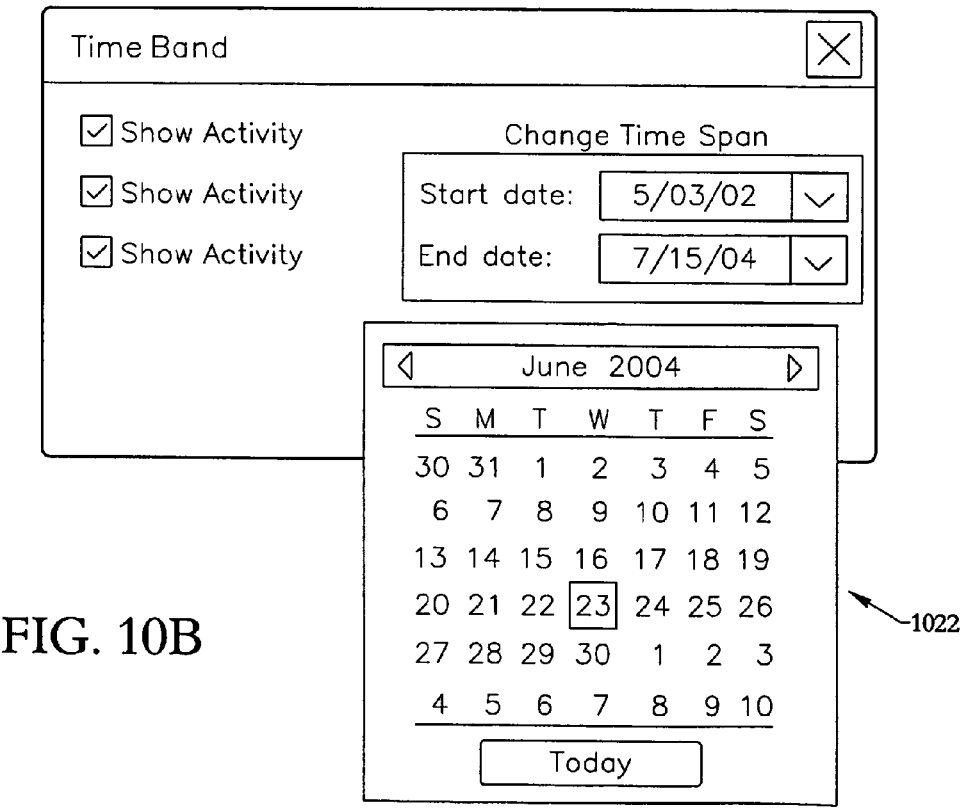

The time band feature 880 and the activity band 890 each provide a mechanism by which user's can browse and locate notes, using visually presented date/time and calendar feature. FIGS. 10A and 10B each illustrate a configuration panel 1010 for configuring the time band 880 and the activity band 890. The configuration panel 1010 may be configured by specifying a date range using fields 1012 and 1014. As shown by FIG. 10B, these fields may be used to open a calendar 1022 for selecting either the beginning date or ending date of a date range, The date range may specify the top and bottom of the time band 880, and/or the notes that are to appear in the presentation 802 for the given time period. A checkbox feature 1016 may be used for the user to select the activity band 890 to appear. Another checkbox feature 1018 may be used for the user to select dates to appear in the time band 880. A third checkbox feature 1020 may be used to show ticks in the time band 880.

Accelerator

As a scroll or navigation feature, embodiments may employ a variable speed scroll feature. Referring to FIGS. 8A and 8B, a variable speed scroll bar 895 is provided adjacent to the time band 880 and the activity marker 890. The variable scroll bar 895 can be moved lengthwise or longitudinally, in order to effectuate the notes in the panel 812 to scroll at a speed and direction that depends on the position of the bar 895 is relation to a reference 896. In one embodiment, the reference is a centerline of the scroll bar and/or panel 812. The farther a marker of the scroll bar 895 is from the centerline, the faster the scrolling function is performed to propagate notes through the panel 812 in the directions specified by the scroll bar. Thus, for example, if the scroll bar is moved several inches from the center line, the scroll speed of the notes in the second panel 812 is fast. Conversely, if the scroll bar is moved near the centerline, the scroll speed is slow.

In addition to varying speed in relation to the position of the scroll bar, an embodiment provides that the scroll speed of the notes in the panel 812 may accelerate, particularly when the scroll bar 895 is moved farther away from the centerline. Thus, for example, when the user knows he needs to move from the end of the tape to its beginning, the user can move the scroll bar 895 far from the centerline and effectuate an increasingly faster scroll speed until the beginning is reached. Such a function enables scrolling through notes rendered in an end-to-end fashion to be performed very rapidly.

Additional Features

Embodiments of the invention permit users to assign colors to individual notes. The assignment of colors may be automated, similar in manner to how notes may be automatically categorized. Thus, the user may configure the electronic note system 110 to assign a color for a particular category or data type or other distinguishing characteristic of the note.

Since notes may contain confidential information, a user may be able to individually password protect notes. Notes may be password protected individually, even if other notes in a similar category are not password protected. Furthermore, it is possible for only a portion of the overall content provided by a note to be encrypted or locked. For example, the user may make the introduction portion of a text in the content body unprotected, so he can see what is in the note when he is subsequently browsing the notes. But sensitive information in the same note may be blocked from view and password accessible.

Alternative Embodiments

While embodiments described herein incorporate user-interface features and functionality with a system that manages electronic notes, it should be apparent that many user-interface features and methodologies may be implemented with other file and record management systems, or just simply in other contexts. That is, many features (such as the accelerator bar or the histogram) may be used in other applications and file systems.

According to an embodiment, the electronic note system 110 is capable of interfacing with devices and sources from which media content may be provided. In one embodiment, when the electronic note system 110 is interfaced with a media source, the electronic note system takes some action to capture media in the content body of a note. The electronic note system 110 may also take some action to categorize or arrange the note in relation to other notes. In one embodiment, the electronic note system 110 may be used to receive images from a digital camera. The image may be captured and copied onto the content body of the note, either automatically or manually by the user. Once captured, the note may be arranged. For example, the image may be placed at the "end of the tape" as a new note. As an additional or alternative, the note may be categorized based on, for example, the type of device (e.g. digital camera) or the source that provides the image, or based on the type of data that is received (rich image data).

Conclusion

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method of managing electronic notes, comprising:
storing visual data for at least one of the electronic notes;
presenting information corresponding to the visual data for the at least one of the electronic notes using a first user interface, wherein the first user interface facilitates entry and modification by a user of the visual data for the electronic notes; and defining an action for the at least one of the electronic notes using a second user interface different from the first user interface, wherein the action is implemented by a method that automatically performs the action for the at least one of the electronic notes and wherein the action is selected from the group consisting of: automatically deleting the at least one of the electronic notes after a predetermined amount of time has passed, providing an alarm after a predetermined amount of time has passed, receiving content that is copied to the at least one of the electronic notes, and password-protecting the at least one of the electronic notes after a pre-determined amount of time has lapsed.

2. A method, according to claim 1, wherein the action corresponds to a script provided by a user.

3. A method, according to claim 2, wherein the script is provided by one of: a wizard and a programmatic assistant that facilitates creating and defining scripts for performing automated actions using specified notes.

4. A method, according to claim 1, wherein a user provides timing information indicating when the action is to be performed using the at least one of the electronic notes.

5. A method, according to claim 4, wherein the timing information is provided by a wizard.

6. A method, according to claim 5, wherein the timing information is provided by the user via the second user interface.

7. Computer software, provided in a non-transitory computer readable medium, that manages electronic notes, the software comprising:

executable code that stores visual data for at least one of the electronic notes;

executable code that presents information corresponding to the visual data for the at least one of the electronic notes using a first user interface, wherein the first user interface facilitates entry and modification by a user of the visual data for the electronic notes; and executable code that facilitates defining an action for the at least one of the electronic notes using a second user interface different from the first user interface, wherein the action is implemented by a method that automatically performs the action for the at least one of the electronic notes and wherein the action is selected from the group consisting of: automatically deleting the at least one of the electronic notes after a predetermined amount of time has passed, providing an alarm after a predetermined amount of time has passed, receiving content that is copied to the at least one of the electronic notes, and password-protecting the at least one of the electronic notes after a pre-determined amount of time has lapsed.

8. Computer software, according to claim 7, wherein the action corresponds to a script provided by a user.

9. Computer software, according to claim 8, wherein the script is provided by one of: a wizard and a programmatic assistant that facilitates creating and defining scripts for performing automated actions using specified notes.

10. Computer software, according to claim 7, wherein a user provides timing information indicating when the action is to be performed using the at least one of the electronic notes.

11. Computer software, according to claim 10, wherein the timing information is provided by a wizard.

12. Computer software, according to claim 11, wherein the timing information is provided by the user via the second user interface.

\* \* \* \* \*